United States Patent
Ariga et al.

(10) Patent No.: US 9,889,436 B2
(45) Date of Patent: Feb. 13, 2018

(54) CHABAZITE-TYPE ZEOLITE AND METHOD FOR PRODUCING SAME, COPPER LOADED LOW-SILICA ZEOLITE AND NOX REDUCTIVE REMOVAL CATALYST CONTAINING THE ZEOLITE, AND METHOD OF NOX REDUCTIVE REMOVAL USING THIS CATALYST

(75) Inventors: Ko Ariga, Shunan (JP); Hidekazu Aoyama, Shunan (JP); Yuuki Ito, Shunan (JP)

(73) Assignee: TOSOH CORPORATION, Shunan-shi, Yamaguchi (JP)

( * ) Notice: Subject to any disclaimer, the term of this patent is extended or adjusted under 35 U.S.C. 154(b) by 472 days.

(21) Appl. No.: 13/995,841

(22) PCT Filed: Dec. 22, 2011

(86) PCT No.: PCT/JP2011/079803
§ 371 (c)(1),
(2), (4) Date: Jun. 19, 2013

(87) PCT Pub. No.: WO2012/086753
PCT Pub. Date: Jun. 28, 2012

(65) Prior Publication Data
US 2013/0280160 A1  Oct. 24, 2013

(30) Foreign Application Priority Data

Dec. 22, 2010 (JP) ................................. 2010-285496
Mar. 23, 2011 (JP) ................................. 2011-064882

(51) Int. Cl.
| | | |
|---|---|---|
| B01J 29/06 | (2006.01) |
| B01J 29/76 | (2006.01) |
| C01B 39/48 | (2006.01) |
| B01D 53/56 | (2006.01) |
| B01D 53/94 | (2006.01) |

(52) U.S. Cl.
CPC .......... B01J 29/763 (2013.01); B01D 53/565 (2013.01); B01D 53/9418 (2013.01); C01B 39/48 (2013.01); B01D 2255/20761 (2013.01); B01D 2255/50 (2013.01); B01J 2229/186 (2013.01); Y10T 428/2982 (2015.01)

(58) Field of Classification Search
USPC ............................ 502/60, 85; 423/700, 704
See application file for complete search history.

(56) References Cited

U.S. PATENT DOCUMENTS

| | | | |
|---|---|---|---|
| 3,030,181 A | 4/1962 | Milton | |
| 4,496,786 A | 1/1985 | Santilli et al. | |
| 4,503,024 A | 3/1985 | Bourgogne et al. | |
| 4,544,538 A | 10/1985 | Zones | |
| 4,665,110 A | 5/1987 | Zones | |
| 5,516,497 A | 5/1996 | Speronello et al. | |
| 6,488,741 B2 | 12/2002 | Olson | |
| 6,709,644 B2 | 3/2004 | Zones et al. | |
| 2008/0202107 A1* | 8/2008 | Boorse ............... | B01D 53/9418 60/301 |
| 2011/0020204 A1* | 1/2011 | Bull .................... | B01D 53/9418 423/239.2 |
| 2011/0182790 A1* | 7/2011 | Chandler ........... | B01D 53/9418 423/213.5 |
| 2012/0269719 A1* | 10/2012 | Moden ............... | B01D 53/9418 423/709 |

FOREIGN PATENT DOCUMENTS

| | | |
|---|---|---|
| GB | 868846 A | 5/1961 |
| JP | 58-60612 A | 4/1983 |
| JP | 60-92221 A | 5/1985 |
| JP | 5-78266 A | 3/1993 |
| JP | 8-59566 A | 3/1996 |
| JP | 9-124578 A | 5/1997 |
| JP | 2001-525241 A | 12/2001 |
| JP | 2002-512083 A | 4/2002 |
| JP | 2005-503260 A | 2/2005 |
| JP | 2007-534582 A | 11/2007 |
| JP | 2008-521744 A | 6/2008 |
| JP | 2010-519038 A | 6/2010 |
| JP | 2010-163349 A | 7/2010 |
| JP | 2010-168269 A | 8/2010 |
| JP | 2011-102209 A | 5/2011 |
| WO | 99/29400 A1 | 6/1999 |
| WO | 99/53880 A1 | 10/1999 |
| WO | 03/026780 A1 | 4/2003 |
| WO | 2005/063622 A2 | 7/2005 |
| WO | 2006/057760 A1 | 6/2006 |
| WO | 2008/106519 A1 | 9/2008 |
| WO | WO 2010/043891 * | 4/2010 |
| WO | 2010/054034 A2 | 5/2010 |
| WO | 2010/074040 A1 | 7/2010 |

OTHER PUBLICATIONS

Japanese Office Action dated Jun. 13, 2014 issued in application No. 2011-279974.
Dustin W. Fickel and Raul F. Lobo, "Copper Coordination in Cu-SSZ-13 and Cu-SSZ-16 Investigated by Variable-Temperature XRD", J. Phys. Chem. C 2010, 114, 1633-1640.
Sodium metasilicate retrieved from ttp://www.sigmaaldrich.comicatalog/product/aldrich/307815?lang=ja&region=JP, Apr. 11, 2014.
Database of Zeolite Structures retrieved from http://izasc.ethz.ch/fmi/xsl/IZA-SC/ftc_fw.xsl?-db=Atlas_main&-lay=fw&STC=LTA &-find, Apr. 11, 2014.
Zeolyst retrieved from http://www.zeolyst.com/our-products/standard-zeolite-powders/zeolite-y.aspx, Apr. 11, 2014.

(Continued)

*Primary Examiner* — Elizabeth Wood
(74) *Attorney, Agent, or Firm* — Sughrue Mion, PLLC

(57) ABSTRACT

The chabazite-type zeolite of the present invention has a $SiO_2/Al_2O_3$ molar ratio of less than 15, and an average particle size from 1.0 μm to 8.0 μm. The chabazite-type zeolite of the present invention has excellent durability and heat resistance, and the copper-loaded chabazite-type zeolite has an improved NOx reduction rate at low temperatures compared to conventional copper-loaded chabazite-type zeolite.

13 Claims, 6 Drawing Sheets

(56) References Cited

OTHER PUBLICATIONS

Atlas of Zeolite Framework Types, Fifth Revised Edition, 2001, pp. 96-97.
Nature, Jun. 28, 1958, pp. 1794-1976, vol. 181.
Maria-Jose Diaz-Cabanas, et al., "Synthesis and structure of pure SiO2 chabazite: the SiO2 Polymorph with the lowest framework density", Chem. Commun. 1998, pp. 1881-1882.
International Search Report for PCT/JP2011/079803 dated Apr. 3, 2012.
Chinese Office Acton dated May 15, 2015 issued in Application No. 201180065705.6.

* cited by examiner

CHABAZITE-TYPE ZEOLITE AND METHOD FOR PRODUCING SAME, COPPER LOADED LOW-SILICA ZEOLITE AND NOX REDUCTIVE REMOVAL CATALYST CONTAINING THE ZEOLITE, AND METHOD OF NOX REDUCTIVE REMOVAL USING THIS CATALYST

This application is a National Stage of International Application No. PCT/JP2011/079803, filed on Dec. 22, 2011, which claims priority from Japanese Patent Application No. 2010-285496, filed Dec. 22, 2010, and Japanese Patent Application No. 2011-064882 filed Mar. 23, 2011, the contents of all of which are incorporated herein by reference in their entirety.

TECHNICAL FIELD

The present invention relates to a chabazite-type zeolite having large crystals, and to its method of production.

The present invention relates to a novel copper loaded chabazite-type zeolite. It also relates to a NOx reductive removal catalyst including chabazite-type zeolite with a higher NOx reduction rate at low temperature than conventional copper loaded chabazite-type zeolite catalysts.

It also relates to a method for reducing NOx contained in a gas flow in the presence of oxygen using the NOx reductive removal catalyst.

BACKGROUND ART

Chabazite-type zeolite is a zeolite which has a three-dimensional pore structure configured constructed from 8-membered oxygen rings of 3.8×3.8 angstrom, and is designated and classified with the structure type code of CHA, as a zeolite identified the detailed crystal structure, by the International Zeolite Association (Non-Patent Document 1).

Chabazite-type zeolite is known as the naturally occurring zeolite, and typically has the composition of $Ca_6^{2+}$ $[Si_{24}Al_{12}O_{72}]$ (Non-Patent Document 2). As examples of synthetic zeolite, the chabazite-type zeolite with a $SiO_2/Al_2O_3$ molar ratio of 3.45-4.9 has been disclosed as Zeolite D in Patent Document 1, and as Zeolite R in Patent Document 2. As a typical method of synthesis, the method in which a chabazite-type zeolite is crystallized from Y-type zeolite as a raw material under hydrothermal conditions is disclosed in Patent Document 3.

In Patent Document 4 and Patent Document 5, the so-called high-silica chabazite-type zeolite with a $SiO_2/Al_2O_3$ molar ratio of 5-50, which is designated as SSZ-13, and its method of synthesis are disclosed.

In Patent Document 6, the chabazite-type zeolite with a $SiO_2/Al_2O_3$ molar ratio of 20-50 and a crystal diameter of 0.5 μm or less is disclosed as SSZ-62.

Furthermore, the possibility to synthesize a chabazite-type zeolite with a $SiO_2/Al_2O_3$ molar ratio of 50 or more is respectively disclosed in Patent Document 7 and Non-Patent Document 3 with respect to the method to produce it with fluorine, and in Patent Document 8 with respect to the method without fluorine.

In recent years, a copper loaded chabazite-type zeolite has particularly attracted attention as a selective reduction catalyst of NOx in automotive exhaust gas.

As an example of copper loaded chabazite-type zeolite, there has been disclosure of a catalyst loading copper on SSZ-62 (Patent Document 6), as well as a copper loaded catalyst wherein the $SiO_2/Al_2O_3$ molar ratio is greater than approximately 15, and the atomic ratio of copper to aluminum is in a range exceeding approximately 0.25 (Patent Document 9).

Moreover, Patent Document 10 discloses a catalyst consisting of chabazite-type zeolite wherein the $SiO_2/Al_2O_3$ molar ratio is 15-50, and the average particle size is 1.5 μm or more.

There has also been disclosure of a chabazite-type zeolite which has a $SiO_2/Al_2O_3$ molar ratio of less than 15, and which can be used as a NOx removal catalyst (Patent Document 11). Furthermore, in Patent Document 11, it is shown that a chabazite-type zeolite with a $SiO_2/Al_2O_3$ molar ratio of less than 10 is desirable for use in the thermal condition at 700° C.

However, these chabazite-type zeolite catalysts still have insufficient NOx reduction rates in low-temperature region after durability treatment in a high-temperature steam atmosphere (also referred to as "hydrothermal durability treatment"). Consequently, a NOx reductive removal catalyst with higher performance is desired.

Thus, chabazite-type zeolites are anticipated to be utilized in a variety of applications, particularly as an adsorbent or a catalysis support. However, for industrial use, it must have sufficient ion exchange capacity and solid acidity, as well as durability for an adsorbent or catalysis support. For example, for use in an adsorption-desorption process involving a thermal regeneration step, the zeolites are required not to decline in the adsorption performance even when repeatedly heated, or zeolite catalysts used in exhaust gas purification are required to have the thermal durability in order to retain the catalytic performance under high temperature. Furthermore, for use in catalysts and adsorbents, the particle size distribution of zeolites must be in the appropriate range, because zeolites are used in the form of an extruded product or a coated one onto honeycomb substrate. Consequently, a previously unobtainable chabazite-type zeolite is required which has better durability and heat resistance, which has a high NOx reduction rate in low-temperature region after hydrothermal durability treatment, and which also has a controlled particle size distribution.

PRIOR ART REFERENCES

Patent Documents

Patent Document 1: British Patent No. 868,846
Patent Document 2: U.S. Pat. No. 3,030,181
Patent Document 3: U.S. Pat. No. 4,503,024
Patent Document 4: U.S. Pat. No. 4,544,538
Patent Document 5: U.S. Pat. No. 4,665,110
Patent Document 6: U.S. Pat. No. 6,709,644
Patent Document 7: Published Japanese Translation No. 2007-534582 of the PCT International Application
Patent Document 8: Published Japanese Translation No. 2008-521744 of the PCT International Application
Patent Document 9: Published Japanese Translation No. 2010-519038 of the PCT International Application
Patent Document 10: Japanese Unexamined Patent Application, First Publication No. 2010-168269
Patent Document 11: U.S. Patent 2011/020204A1

Non-Patent Documents

Non-Patent Document 1: Atlas of Zeolite Framework Types, Fifth Revised Edition, p. 96, (2001)
Non-Patent Document 2: Nature, Vol. 181, p. 1794 (1958)
Non-Patent Document 3: Chem. Commun, p. 1881 (1998)

DISCLOSURE OF THE INVENTION

Problems that the Invention is to Solve

The object of the present invention is to provide a chabazite-type zeolite as a base material for catalytic support or adsorbents which has a high Al content in terms of the number of ion exchange sites or solid acid amount, and which has a high level of durability and heat resistance, as well as a method for producing the same. Furthermore, the present invention provides a novel copper loaded chabazite-type zeolite. In addition, compared to conventional copper loaded chabazite-type zeolite catalysts, it provides a NOx reductive removal catalyst containing the copper loaded zeolite which has a high NOx reduction rate in low-temperature region, as well as a method for reductive removal of NOx by using the catalyst.

Means for Solving the Problems

The present inventors conducted diligent research concerning improvement of the durability and heat resistance of chabazite-type zeolites, and a method for producing the zeolites. As a result, they have found that a chabazite-type zeolite having a $SiO_2/Al_2O_3$ molar ratio of less than 15, which is useful for a catalyst, adsorbent or ion exchange agent, and an average particle size from 1.0 μm to 8.0 μm exhibits a high level of durability and heat resistance and further have found a method of producing the novel chabazite-type zeolite of the present invention. The invention has been completed.

The present invention has the following aspects.

(1) A chabazite-type zeolite, wherein the zeolite has a $SiO_2/Al_2O_3$ molar ratio of less than 15 and an average particle size of from 1.0 μm to 8.0 μm.

(2) The chabazite-type zeolite according to (1) above, wherein the average particle size is from 1.0 μm to 5.0 μm.

(3) The chabazite-type zeolite according to (1) or (2) above, wherein the zeolite has a volume-based 90% particle size of 15.0 μm or less.

(4) A method for producing the chabazite-type zeolite according to any one of (1) to (3) above, comprising crystallizing a raw material composition in which a structure-directing agent/$SiO_2$ molar ratio in the raw material composition satisfies $$0.05 \leq (\text{structure-directing agent})/SiO_2 < 0.13 \text{ and}$$

in which water/$SiO_2$ molar ratio in the raw material composition satisfies $$5 \leq H_2O/SiO_2 < 30$$

in the presence of at least two types of cations selected from the group consisting of $Na^+$, $K^+$, $Rb^+$, $Cs^+$, and $NH_4^+$.

(5) The method for producing the chabazite-type zeolite according to (4) above, wherein the structure-directing agent includes at least one member selected from the group consisting of a hydroxide, halide, carbonate, methyl carbonate, and sulfate which includes N,N,N-trialkyladamantyl ammonium as a cation, as well as a hydroxide, halide, carbonate, methyl carbonate, and sulfate which includes N,N,N-trimethylbenzyl ammonium ion, N-alkyl-3-quinuclidinol ion, or N,N,N-trialkylexoaminonorbornane as a cation.

(6) The method for producing the chabazite-type zeolite according to (5) above, wherein the structure-directing agent includes at least one member selected from the group consisting of N,N,N-trimethyladamantyl ammonium hydroxide, N,N,N-trimethyladamantyl ammonium halide, N,N,N-trimethyladamantyl ammonium carbonate, N,N,N-trimethyladamantyl ammonium methyl carbonate, and N,N,N-trimethyladamantyl ammonium sulfate.

(7) A chabazite-type zeolite, wherein the zeolite has a $SiO_2/Al_2O_3$ molar ratio of less than 15, an average particle size of from 1.0 μm to 8.0 μm and copper is loaded with copper.

(8) The chabazite-type zeolite according to (7) above, wherein the average particle size is from 1.0 μm to 5.0 μm.

(9) The chabazite-type zeolite according to either (7) or (8) above, wherein the zeolite has a volume-based 90% particle size of 15.0 μm or less.

(10) The chabazite-type zeolite according to any one of (7) to (9) above, wherein an atomic ratio of copper/aluminum of the zeolite is 0.10 to 1.00.

(11) The chabazite-type zeolite according to any one of (7) to (10) above, wherein ion exchange sites of the zeolite are occupied by copper and/or protons ($H^+$).

(12) The chabazite-type zeolite according to any one of (7) to (11) above, wherein a crystal structure of the zeolite is SSZ-13.

(13) A NOx reductive removal catalyst, including the chabazite-type zeolite according to any one of (7) to (12) above.

(14) The NOx reductive removal catalyst according to (13) above, wherein a NOx reduction rate at 150° C. after hydrothermal durability treatment is 52% or more.

(15) A method for reductive removal of NOx, using the NOx reductive removal catalyst according to (13) or (14) above.

Effects of the Invention

The chabazite-type zeolite of the present invention has a composition that is useful as a base material for catalyst support or adsorbents, and exhibits a high level of durability and heat resistance. The particle size distribution of the chabazite-type zeolite of the present invention is also controlled to be useful for practical application. Furthermore, the chabazite-type zeolite with a high level of durability and heat resistance can be produced under conditions that the used amount of the expensive organic structure-directing agent is small. In addition, a NOx reductive removal catalyst including the copper loaded chabazite-type zeolite of the present invention exhibits high catalytic activity even after hydrothermal durability treatment.

MODE FOR CARRYING OUT THE INVENTION

Figure 1:
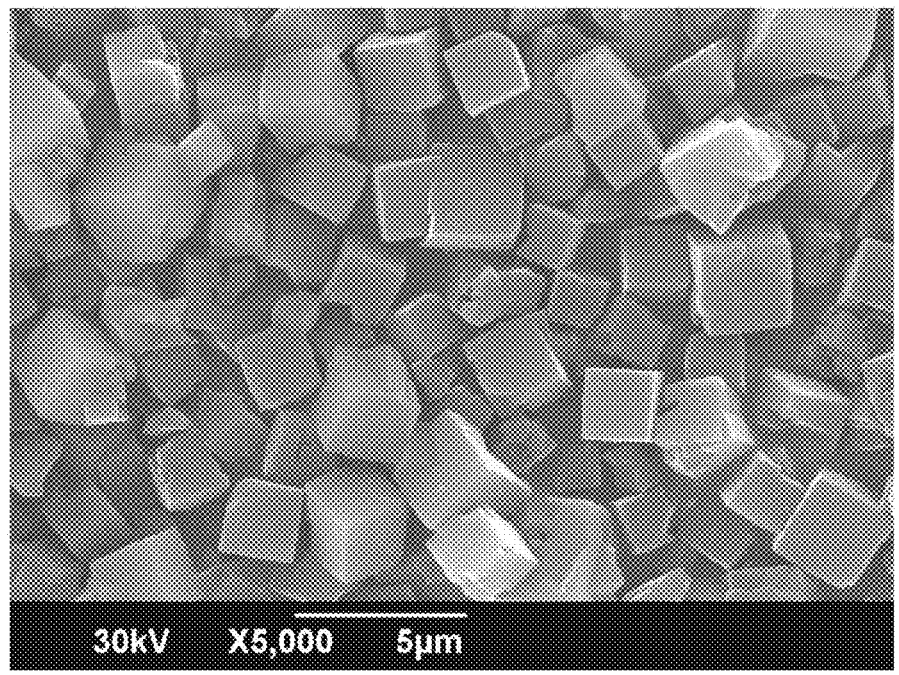
FIG. 1 is a scanning electron microscope (hereinafter referred to as "SEM") photograph of Zeolite 1.
Figure 2:
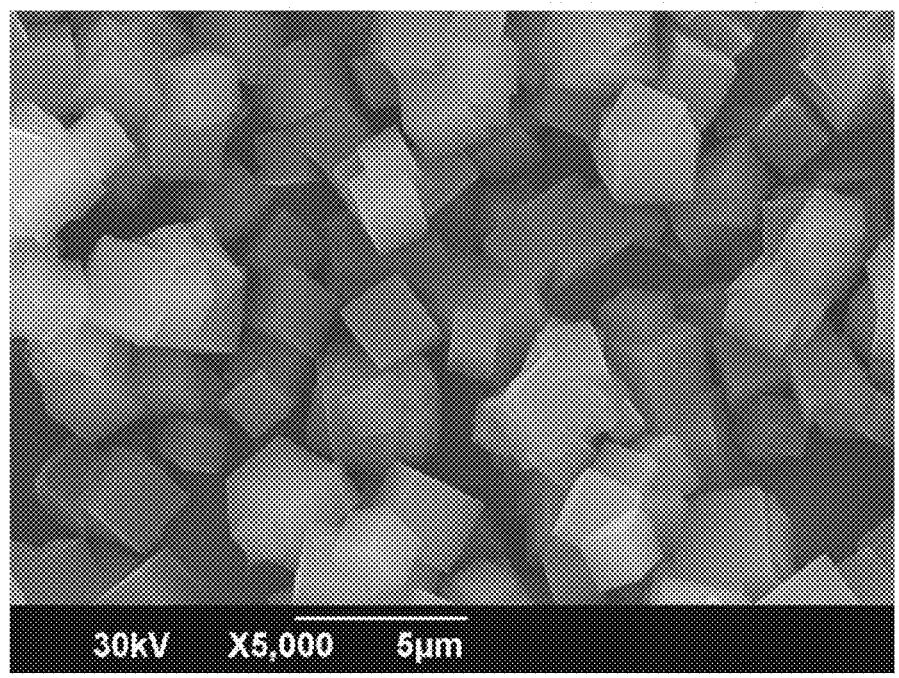
FIG. 2 is an SEM photograph of Zeolite 3.
Figure 3:
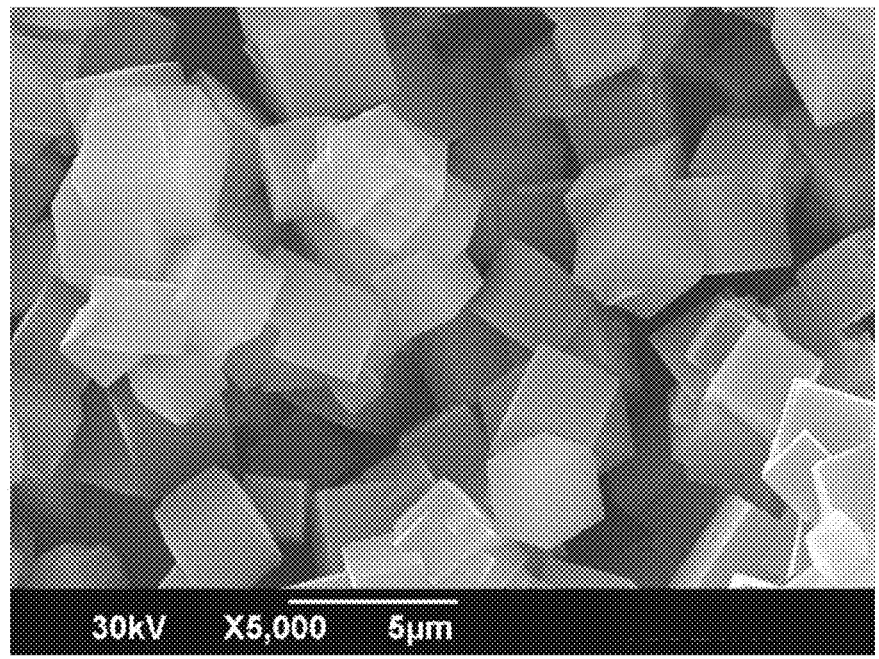
FIG. 3 is an SEM photograph of Zeolite 5.
Figure 4:
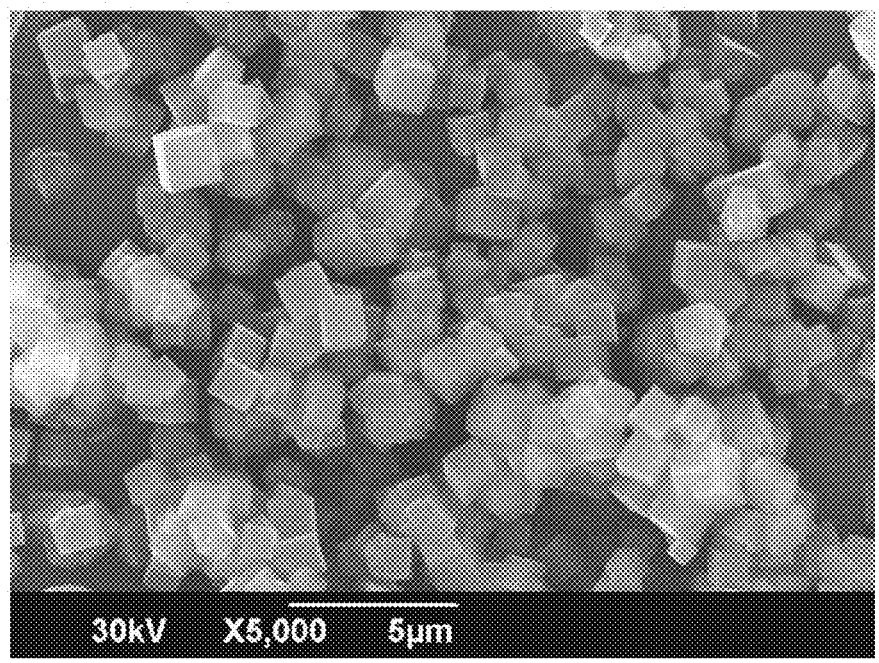
FIG. 4 is an SEM photograph of Zeolite 9.
Figure 5:
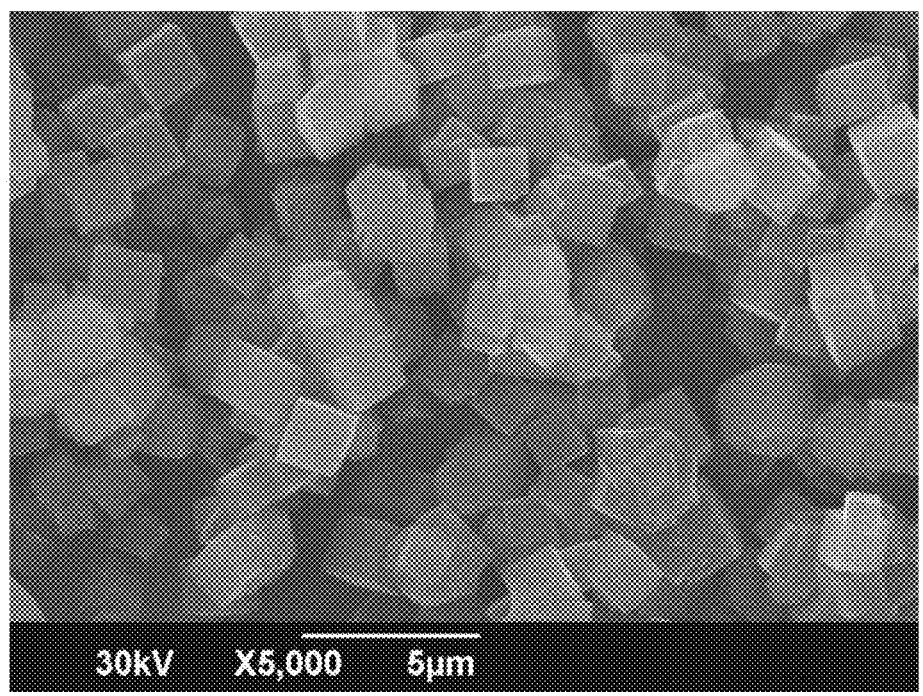
FIG. 5 is an SEM photograph of Zeolite 10.
Figure 6:
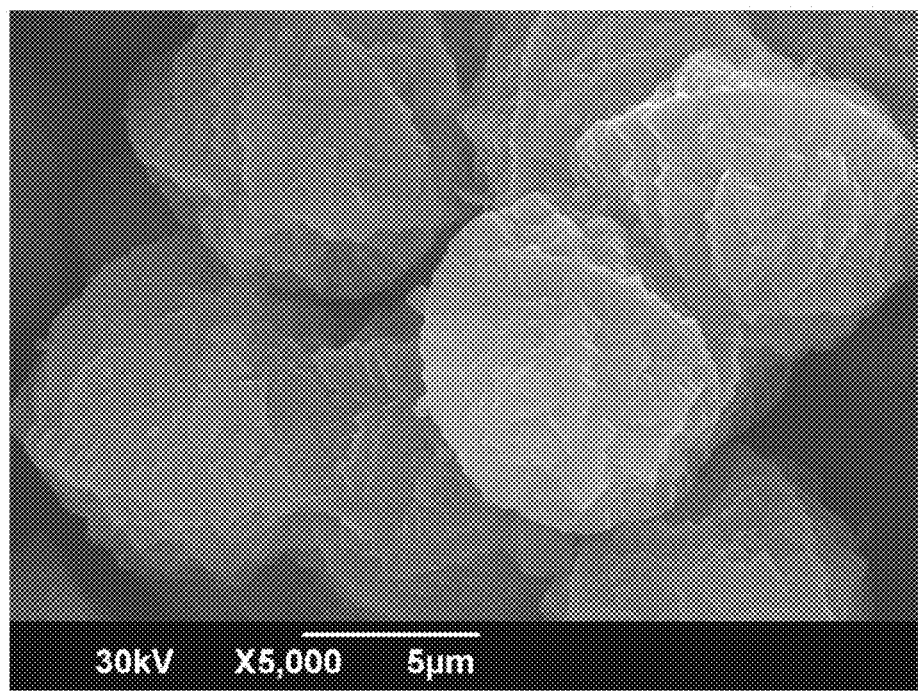
FIG. 6 is an SEM photograph of Comparative Zeolite 1.
Figure 7:
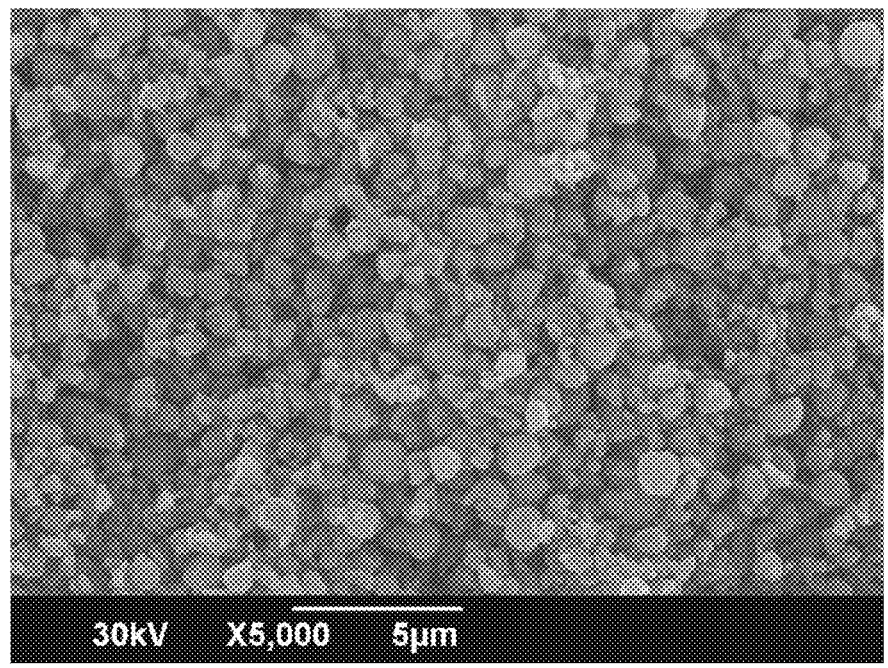
FIG. 7 is an SEM photograph of Comparative Zeolite 2.
Figure 8:
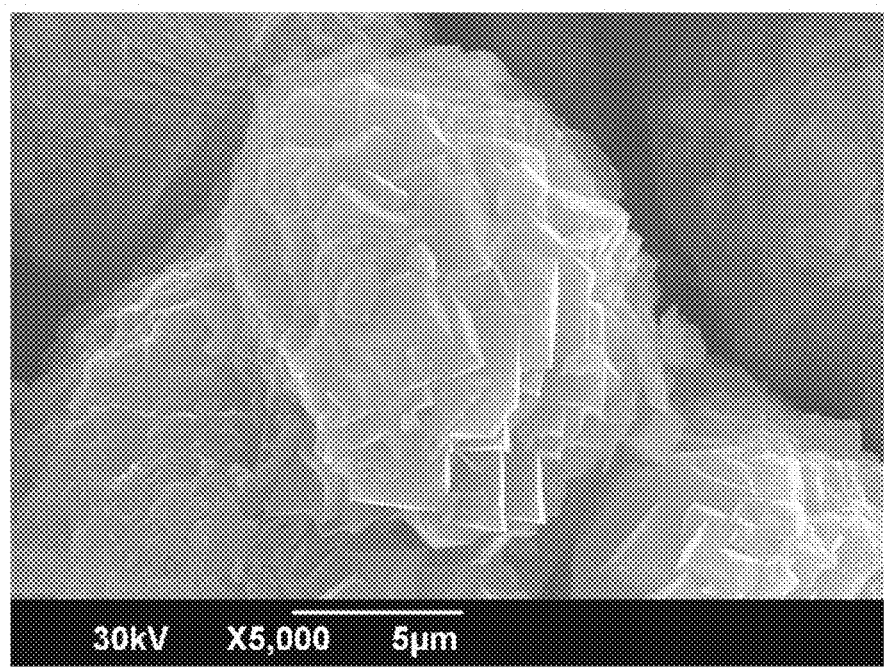
FIG. 8 is an SEM photograph of Comparative Zeolite 3.
Figure 9:
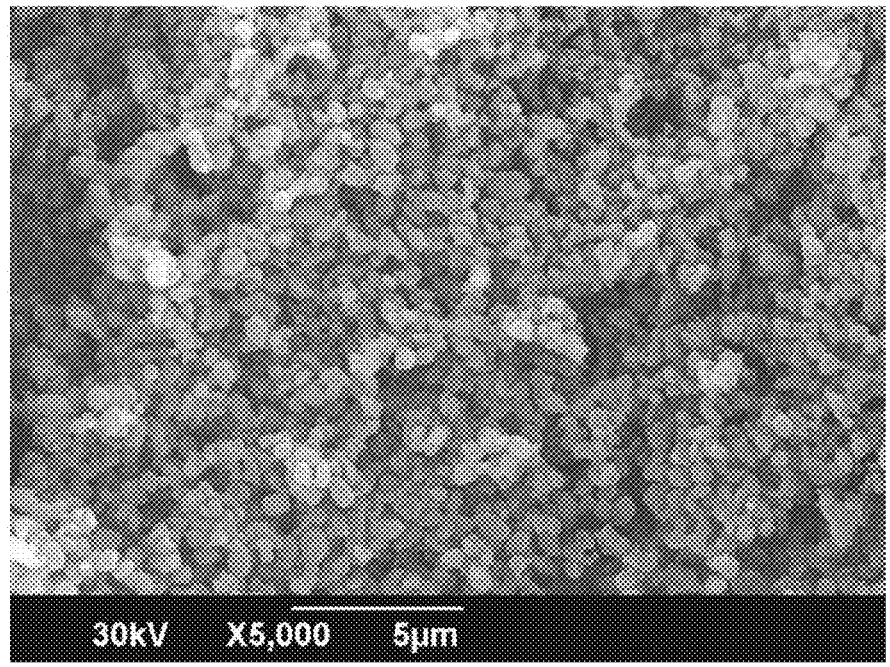
FIG. 9 is an SEM photograph of Comparative Zeolite 5.
Figure 10:
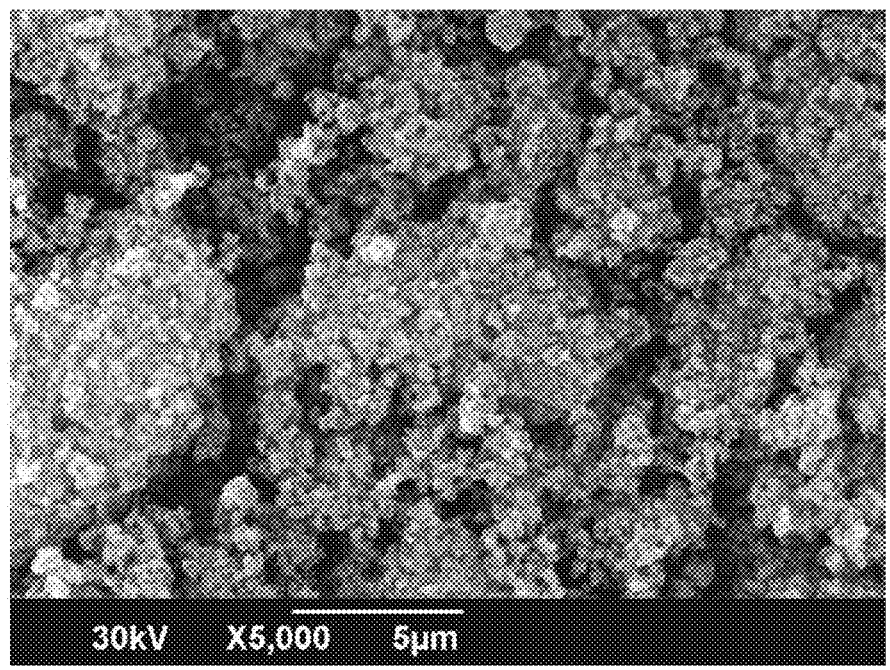
FIG. 10 is an SEM photograph of Comparative Zeolite 10.
Figure 11:
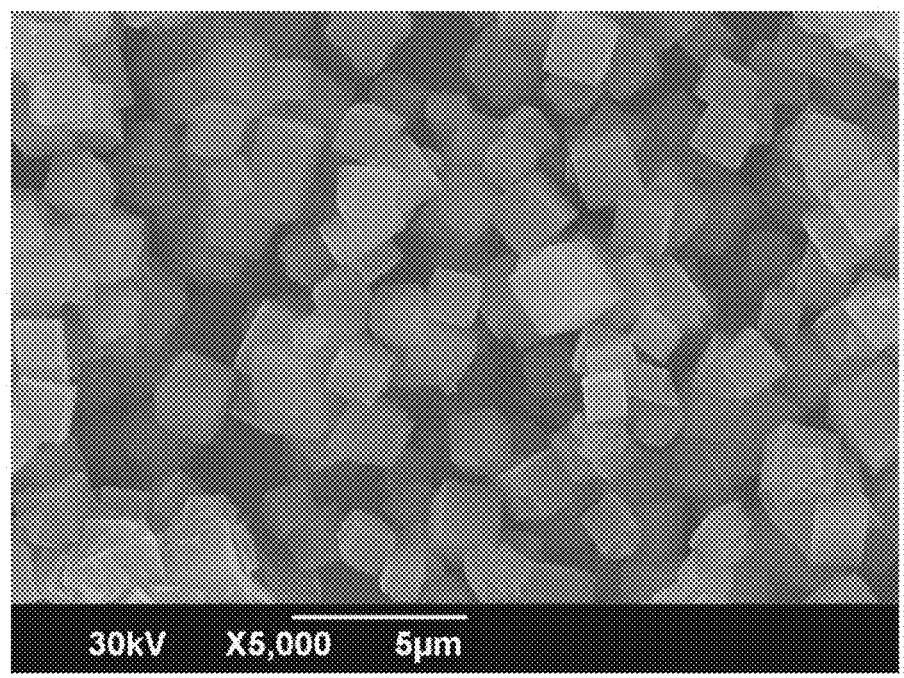
FIG. 11 is an SEM photograph of the copper-loaded zeolite obtained in Example 21.

The chabazite-type zeolite of the present invention is described below.

The chabazite-type zeolite of the present invention is a high-silica chabazite with a $SiO_2/Al_2O_3$ molar ratio of less than 15. The $SiO_2/Al_2O_3$ molar ratio is preferably 10 or higher but less than 15. In the case that the $SiO_2/Al_2O_3$ molar ratio is 15 or higher, the durability and heat resistance useful for an adsorbent or a catalyst support can be obtained, but the ion exchange capacity or solid acidity required for some applications may be insufficient.

The heat resistance of the chabazite-type zeolite of the present invention is assessed by the residual rate of crystallinity after hydrothermal durability treatment. The durability of the copper loaded chabazite-type zeolite is assessed by the NOx reduction rate, also after hydrothermal durability treatment. In addition, hydrothermal durability treatment was conducted for 1 hour at a temperature of 900° C. at a space velocity of 6,000 hr$^{-1}$ under air flow containing 10 volume % of water vapor. The performance of a NOx reduction catalyst is generally assessed by the performance after hydrothermal durability treatment. There is no particular standardized method with respect to the hydrothermal durability treatment. Therefore, the hydrothermal durability treatment conditions of the chabazite-type zeolite of the present invention are within the range of conditions that are generally used as hydrothermal durability treatment conditions for NOx reduction catalysts, and there is nothing particularly special about these conditions.

The average particle size of the chabazite-type zeolite of the present invention is from 1.0 μm to 8.0 μm. The crystal size less than 1.0 μm previously reported, tends to decline the durability and heat resistance, in the case of using it for adsorbents or catalyst supports. On the other hand, in the case the average particle size exceeds 8.0 μm, clogging or peeling tends to occur when the zeolite is coated onto a honeycomb substrate, and is a factor in the deterioration of compressive strength when used for molded products.

The crystal particles of the chabazite-type zeolite of the present invention have the characteristics that most are dispersed as rhombohedral or cuboidal particles, and that they have a crystal particle form that enables rhombohedrons to be clearly observed. Consequently, the average particle size of the chabazite-type zeolite of the present invention is assessed by the sizes of the crystal particle dispersed independently. In the previously reported chabazite-type zeolites, there is formation of aggregate particles consisting of multiple crystal particles with indefinite interparticle boundaries due to aggregation growth, which differs from the particle form of the chabazite-type zeolite of the present invention. From the standpoints of the industrial manufacturing technology of synthetic zeolite and its use in adsorbents or catalysts, the average particle size of the chabazite-type zeolite of the present invention is preferably from 1.0 μm to 5.0 μm.

Average particle size of the chabazite-type zeolite of the present invention signifies average particle size based on observation by SEM. Here, average particle size based on observation by SEM is the particle size (primary particle size) from observation images obtained by scanning electron microscope (SEM), and is an average value of the sizes of the respective chabazite-type zeolite particles existing within a view field of optional magnification where 50 or more primary particles can be observed.

With respect to the average particle size of the chabazite-type zeolite of the present invention, even with chabazite-type zeolite which has an average particle size that does not fall within the range from 1.0 μm to 8.0 μm when measured by a method other than the measurement method for average particle size based on observation by SEM, if it is from 1.0 μm to 8.0 μm upon measurement by the method based on observation by SEM, it falls within the range of average particle size of the chabazite-type zeolite of the present invention.

Average particle size based on observation by SEM can, for example, be evaluated by an arithmetic average of particle sizes obtained by conducting measurement in an optional direction of 50 or more crystal particles randomly selected in one or more observation view fields photographed at a 5.000-fold magnification. If the form and the number of the crystal particles can be clearly observed, there are no particular limitations on conditions of the observation by SEM.

In the chabazite-type zeolite of the present invention, the 90% particle size is preferably 15.0 μm or less, and more preferably 10.0 μm or less. While the aforementioned average particle size is for primary particles based on observation by SEM, 90% particle size signifies a particle size of these aggregate particles.

The particle size distribution of the chabazite-type zeolite of the present invention can be evaluated by particle size distribution measurement (volumetric distribution) by laser diffraction and scattering method. Particle size distribution by laser diffraction and scattering method can be quantitated with satisfactory reproducibility by conducting measurement after treatment that disperses zeolite in water, and that renders the dispersed state of the crystal particles uniform by ultrasonic homogenizer. When the 90% particle size exceeds 15.0 μm, it is difficult to obtain the dispersed crystal particles dispersed with the average particle size from 1.0 μm to 8.0 μm that is a characteristic feature of the chabazite-type zeolite of the present invention. In addition, clogging or peeling tends to occur when the zeolite is coated onto a honeycomb substrate, which is a factor in deterioration of compressive strength when used for molded products.

Next, a method for producing the chabazite-type zeolite of the present invention is described.

The raw material of the chabazite-type zeolite of the present invention consists of a silica source, an aluminum source, an alkali source, a structure-directing agent (hereinafter referred to as "SDA"), and water. It is also acceptable to add components that have a crystallization promoting effect such as seed crystal.

As the silica source, one may use, for example, colloidal silica, amorphous silica, sodium silicate, tetraethyl orthosilicate, aluminosilicate gel, and the like.

As the alumina source, one may use, for example, aluminum sulfate, sodium aluminate, aluminum hydroxide, aluminum chloride, aluminosilicate gel, metallic aluminum, and the like. It is preferable to use silica sources and alumina sources which have a form that enables sufficiently uniform mixing with the other raw materials.

As the alkali source, one may use, for example, various salts such as hydroxides, halides, sulfates, nitrates, and carbonates of sodium, potassium, rubidium, cesium and ammonium, alkali components in aluminates and silicates, alkali components in aluminosilicate gel, and the like.

As the SDA, one may use at least one member selected from the group consisting of a hydroxide, halide, carbonate, methyl carbonate, and sulfate which includes N,N,N-trialkyladamantyl ammonium as a cation, as well as a hydroxide, halide, carbonate, methyl carbonate, and sulfate which includes N,N,N-trimethylbenzyl ammonium ion, N-alkyl-3-quinuclidinol ion, or N,N,N-trialkylexoaminonorbornane as a cation.

As the SDA, it is preferable to use at least one member selected from the group consisting of N,N,N-trimethyladamantyl ammonium hydroxide (hereinafter abbreviated as "TMADAOH"), N,N,N-trimethyladamantyl ammonium halide, N,N,N-trimethyladamantyl ammonium carbonate, N,N,N-trimethyladamantyl ammonium methyl carbonate, and N,N,N-trimethyladamantyl ammonium sulfate.

The chabazite-type zeolite of the present invention can be produced with an $SDA/SiO_2$ molar ratio of at least 0.05 but less than 0.13, and an $H_2O/SiO_2$ molar ratio of at least 5 but less than 30.

With an $SDA/SiO_2$ molar ratio of 0.13 or more, only chabazite-type zeolite with an average crystal particle size of less than 1.5 μm can be obtained as heretofore. Moreover, as the SDA is expensive, an $SDA/SiO_2$ molar ratio of 0.13 or more lacks economic rationality. On the other hand, with an $SDA/SiO_2$ molar ratio of less than 0.05, crystallization of the chabazite-type zeolite is insufficient. Consequently, the heat resistance of the obtained chabazite-type zeolite is insufficient due to generation of byproducts (impurities) or low crystallinity.

When the $H_2O/SiO_2$ molar ratio is 30 or more, the yield is reduced and the process is hence uneconomical. On the other hand, in the case of less than 5, because of eliminating fluidity of the raw material composition caused by increasing of its viscosity, it is difficult to produce industrially. Moreover, in either case, byproducts (impurities, residual unreacted material) tend to be generated.

The $SiO_2/Al_2O_3$ molar ratio of the raw material composition of the chabazite-type zeolite of the present invention is preferably 50 or less. When the $SiO_2/Al2O3$ exceeds 50, it is uneconomical or difficult to synthesize chabazite-type zeolite with a $SiO_2/Al_2O_3$ molar ratio of less than 15.

The $OH/SiO_2$ molar ratio which is an index of the hydroxyl ion amount is preferably at least 0.1 but less than 0.9. It is more preferably from 0.15 to 0.5. When $OH/SiO_2$ molar ratio is less than 0.1, it is difficult for crystallization of zeolite to proceed, and when $OH/SiO_2$ molar ratio is 0.9 or more, it is difficult to obtain chabazite-type zeolite having the $SiO_2/Al_2O_3$ molar ratio and the particle size of the present invention, because dissolution of the silica component is accelerated.

When the chabazite-type zeolite of the present invention is produced, the crystallization is conducted in the presence of at least two types of cations selected from the group consisting of $Na^+$, $K^+$, $Rb^+$, $Cs^+$, and $NH_4^+$ as cations having mineralizing effect. In the case where such cations are not contained, the progression of crystallization proceeds insufficiently at an $SDA/SiO_2$ molar ratio of less than 0.13, and byproducts (impurity crystals) are generated. Furthermore, it is difficult to obtain chabazite-type zeolite with the average particle size from 1.0 μm to 8.0 μm of the present invention. When only one such cation is contained, the crystallization is insufficient, or the zeolite with the average particle size of the present invention is difficult to obtain.

The chabazite-type zeolite of the present invention can be produced by crystallizing from a raw material composition consisting of water, a silica raw material, an alumina raw material, an alkali component, and an SDA for a sufficient period of time in a sealed pressure vessel at any desired temperature of from 100° C. to 200° C. During the crystallization, the raw material composition could be under static conditions, but should preferably be under stirring and mixing conditions.

After termination of crystallization, the resulting matter is cooled sufficiently, subjected to solid-liquid separation, washed with a sufficient amount of pure water and dried at an any desired temperature of from 100° C. to 150° C. to obtain the chabazite-type zeolite of the present invention.

The obtained chabazite-type zeolite may be used as an adsorbent, catalysis support, or ion exchange material. Moreover, the obtained chabazite-type zeolite may also be used after removing the SDA and/or alkali metal contained in the pores as necessary. The SDA and/or alkali metal removal treatment may adopt a liquid-phase treatment using a chemical solution containing a component to decompose an SDA component or an acidic solution, an ion exchange treatment using resin or the like, or a thermal decomposition treatment, or it may adopt a combination of these treatments. Furthermore, one may also use the zeolite after the conversion to the H-type or the $NH_4$-type by utilizing the ion exchange ability of zeolite, and the method may adopt the known techniques.

Next, a description is given of the novel copper-loaded chabazite-type zeolite of the present invention, and of a catalyst including such zeolite.

Chabazite-type zeolite is known as zeolite which is used in NOx reduction catalysts, and particularly in selective catalytic reduction catalysts referred to as SCR catalysts (SCR is an abbreviation for "selective catalytic reduction") that use ammonia as a reducing agent.

The novel copper-loaded chabazite-type zeolite of the present invention is chabazite-type zeolite with a $SiO_2/Al_2O_3$ molar ratio of less than 15, and is a copper-loaded chabazite-type zeolite with an average particle size from 1.0 μm to 8.0 μm.

The novel copper-loaded chabazite-type zeolite of the present invention exhibits excellent catalytic activity when used as an SCR catalyst due to the interaction of the chabazite-type zeolite and the copper.

In this Specification, catalytic activity signifies a NOx reduction rate on the copper-loaded chabazite-type zeolite of the present invention. The atomic ratio of the loaded copper to aluminum (copper/aluminum) is preferably within a range from 0.10 to 1.00. The lower limit of the atomic ratio (copper/aluminum) is preferably 0.15 or more, and more preferably 0.2 or more. The upper limit of the atomic ratio (copper/aluminum) is preferably 0.6 or less, and more preferably 0.4 or less. When the copper/aluminum atomic ratio exceeds 1.00, the catalytic activity significantly declines after hydrothermal durability treatment.

The ion exchange sites of the novel copper-loaded chabazite-type zeolite of the present invention are preferably occupied by copper and/or protons ($H^+$). The NOx reduction rate is further increased by having the ion exchange sites other than the ion exchange sites occupied by copper occupied with protons alone.

The $SiO_2/Al_2O_3$ molar ratio is less than 15, preferably at least 10 but less than 15, more preferably from 10 to 14.8, and still more preferably from 11 to 14.8.

When the $SiO_2/Al_2O_3$ molar ratio at less than 15, the number of ion exchange sites (catalytic active site) is increased compared to conventional chabazite-type zeolites with a high $SiO_2/Al_2O_3$ molar ratio (e.g., chabazite-type zeolite with a $SiO_2/Al_2O_3$ molar ratio of 15-50). By this means, the excellent catalytic activity can be obtained when using the novel copper-loaded chabazite-type zeolite of the present invention as an SCR catalyst.

The average particle size of the novel copper-loaded chabazite-type zeolite of the present invention is from 1.0 μm to 8.0 μm.

By having an average particle size of 1.0 μm or more, preferably 1.2 μm or more, more preferably 1.5 μm or more, and still more preferably 2.0 μm or more, the chabazite-type zeolite of the present invention has become the zeolite with enhanced hydrothermal resistance. As a result, compared to conventional copper-loaded chabazite-type zeolites, not only the NOx reduction rate is higher in high-temperature region from 400° C. or higher and preferably from 400° C. to 600° C. after hydrothermal durability treatment, but also the NOx reduction rate is higher in low-temperature region from 100° C. to 250° C., preferably from 100° C. to 200° C., and more preferably from 150° C. to 200° C. after hydrothermal durability treatment. The causes of the higher NOx reduction rate in the aforementioned low-temperature region are not necessarily clear. However, because the average particle size increases in this range, the NOx reduction rate of the chabazite-type zeolite of the present invention in low-temperature region tends to increase.

The NOx reduction rate of the copper-loaded chabazite-type zeolite of the present invention is 52% or more at 150° C., and more preferably 54% or more at 150° C. after hydrothermal durability treatment. Even in cases where the NOx reduction rate at temperatures other than 150° C. is not 52% or more, copper-loaded chabazite-type zeolites having a reduction rate of 52% or more at 150° C. fall within the range of the NOx reduction rate possessed by the copper-loaded chabazite-type zeolite of the present invention.

On the other hand, if the average particle size becomes too large, the handleability declines when used as a catalyst. Therefore, the average particle size of the chabazite-type zeolite of the present invention is 8.0 μm or less, preferably 5.0 μm or less, and more preferably 3.5 μm or less.

The average particle size in the present invention is that of primary particles that are aggregated by crystallites. Consequently, it differs from that of particles (so-called secondary particles) aggregated by primary particles.

The copper-loaded chabazite-type zeolite of the present invention preferably has a 90% particle size of 15.0 μm or less, and 10.0 μm or less is more preferable. Particle size distribution in the present invention can be evaluated by particle size distribution measurement (volumetric distribution) by laser diffraction and scattering method. Particle size distribution by laser diffraction and scattering method can be quantitated with satisfactory reproducibility by conducting measurement after treatment in which zeolite is dispersed in water, and the dispersed state of the crystal particles is made uniform by ultrasonic homogenizer. When the 90% particle size exceeds 15.0 μm, it is difficult to obtain crystal particles dispersed with the average particle size from 1.0 μm to 8.0 μm that is the characteristic feature of the chabazite-type zeolite of the present invention. In addition, clogging or peeling tends to occur when the zeolite is coated onto a honeycomb substrate, which is a factor in deterioration of compressive strength when used for molded products.

A configurative requirement of the zeolites of the present invention is that they have a chabazite structure. Among these, chabazite-type zeolite having the crystalline structure belong to SSZ-13 is particularly preferable. The reason for this is that it is possible to impart adequate durability to chabazite-type zeolite by having the crystalline structure belong to SSZ-13 in which the $SiO_2/Al_2O_3$ molar ratio is 5 or more.

Next, the method of production and the method of use of the novel copper loaded chabazite-type zeolite of the present invention are described.

There are no particular limitations on the method of production of the novel copper-loaded chabazite-type zeolite of the present invention. For example, the production can be conducted by producing chabazite-type zeolite, converting it to the H-type, and subsequently using it to load copper.

The novel copper loaded chabazite-type zeolite of the present invention is preferably produced by loading copper on chabazite-type zeolite obtained by the above-described production method. It is particularly preferable to produce by loading copper on H-type chabazite-type zeolite. By this means, it is possible to obtain chabazite-type zeolite in which the ion adsorption sites are occupied by copper and/or protons ($H^+$).

If copper can be loaded on the zeolite, there are no particular limitations on the loading method. With respect to the copper-loaded method, one may adopt a method such as ion exchange, impregnation, evaporation to dryness, precipitation, physical mixing, and framework substitution.

As for the raw materials used in copper loading, one may use either soluble or insoluble materials such as nitrates, sulfates, acetates, chlorides, complex salts, oxides, and composite oxides which includes copper.

As a method for loading copper on chabazite-type zeolite, one may cite a method in which copper is loaded by ion exchange using copper acetate monohydrate in a proportion of 0.2-fold equivalent or more and 5.0-fold equivalent or less to the chabazite-type zeolite of the present invention.

With respect to the equivalent number of the employed copper when copper is loaded on chabazite-type zeolite, an amount equivalent to 0.5 in terms of the atomic ratio (Cu/Al) of copper contained in the raw materials used in copper loading to aluminum in the chabazite-type zeolite was considered as 1-fold equivalent.

The novel copper loaded chabazite-type zeolite of the present invention may be used as a catalyst incorporated in a treatment system for an exhaust gas. Furthermore, it may also be used as a catalyst which performs reductive removal of NOx contained in a gas flow in the presence of oxygen, a so-called NOx reduction catalyst.

In particular, the novel copper loaded chabazite-type zeolite of the present invention may be used as a so-called NOx reduction catalyst with excellent low-temperature activity, i.e., as a catalyst which—even after hydrothermal durability treatment—not only has a high NOx reduction rate in high-temperature region of 400° C. or more, and preferably from 400° C. to 600° C., but also has a high NOx reduction rate in low-temperature region from 100° C. to 250° C., preferably from 100° C. to 200° C., and more preferably from 150° C. to 200° C. In the present invention, the NOx reduction rate in high-temperature region after hydrothermal durability treatment is evaluated in terms of the NOx reduction rate at 500° C., and the NOx reduction rate in low-temperature region after hydrothermal durability treatment is evaluated by the NOx reduction rate at 150° C.

The low-temperature activity as an SCR catalyst of the novel copper loaded chabazite-type zeolite of the present invention can be assessed by measuring the NOx reduction rate at a low temperature from 100° C. to 250° C., preferably from 100° C. to 200° C., and more preferably from 150° C. to 200° C. after the aforementioned hydrothermal durability treatment.

A NOx reduction catalyst consisting of the chabazite-type zeolite of the present invention may be used by mixing and molding it with binders such as silica, alumina, and clay minerals. As clay minerals used for molding, one may enumerate kaolin, attapulgite, montmorillonite, bentonite, allophane, and sepiolite. It may also be used by wash coating it onto a honeycomb substrate made of cordierite or metal.

Reductive removal of NOx from exhaust gas can be performed by bringing the aforementioned exhaust gas into contact with a catalyst consisting of the aforementioned chabazite-type zeolite. With respect to the NOx that is reductively removed by the chabazite-type zeolite of the present invention, there is, for example, nitrogen monoxide, nitrogen dioxide, dinitrogen trioxide, dinitrogen tetraoxide, dinitrogen monoxide, and mixtures thereof. Nitrogen monoxide, nitrogen dioxide, and dinitrogen monoxide are preferable. There are no particular limitations on the NOx concentration of exhaust gas that is treatable by the present invention.

It is also effective in cases where components other than NOx are contained in the aforementioned exhaust gas, and hydrocarbon, carbon monoxide, carbon dioxide, hydrogen, nitrogen, oxygen, sulfur oxides, and water may also be contained. Specifically, with the NOx reductive removal method of the present invention, NOx may be reductively removed, for example, from a wide variety of exhaust gas of diesel automobiles, gasoline automobiles, boilers, gas turbines, and so on.

The NOx reductive removal method of the present invention reductively removes NOx in the presence of a reducing agent. Reducing agents such as hydrocarbon, carbon monoxide, and hydrogen that are contained in the aforementioned exhaust gas may be used, and it is also acceptable to bring about coexistence of suitable reducing agents by adding them to the exhaust gas as necessary. There are no particular limitations on the reducing agents that may be added to exhaust gas, and one may cite, for example, ammonia, urea, organic amines, hydrocarbons, alcohols, ketones, carbon monoxide, and hydrogen. In order to further raise NOx reductive removal efficiency, ammonia, urea, and organic amines which have a high reaction selectivity are preferable. There are no particular limitations on the method of addition of these reducing agents, and one may adopt a method in which the reducing components are directly added in gaseous form, a method in which they are sprayed in the liquid form of an aqueous solution, and gasified, a method in which spray pyrolysis is conducted, and the like. The additive amounts of these reducing agents may be optionally set so as to enable sufficient reductive removal of NOx.

With respect to the NOx reductive removal method of the present invention, there are no particular limitations on space velocity while the exhaust gas and a catalyst composed of the chabazite-type zeolite of the present invention are in contact, but a space velocity of 500-500,000 $hr^{-1}$ on a volumetric basis is preferable, and 2,000-300,000 $hr^{-1}$ is more preferable.

EXAMPLES

The present invention is specifically described below by means of examples and comparative examples. However, the present invention is not limited by these examples.

Example 1 (Production of Zeolite 1)

To 13.9 g of a 25% N,N,N-trimethyladamantyl ammonium hydroxide aqueous solution (hereinafter referred to as "25% TMADAOH aqueous solution"), 31.4 g of pure water, 2.5 g of a 48% potassium hydroxide aqueous solution and 9.0 g of amorphous aluminosilicate gel prepared from sodium silicate and aluminum sulfate were added, and the ingredients were sufficiently mixed to obtain a raw material composition. The composition of the raw material composition was $SiO_2$: 0.048 $Al_2O_3$: 0.124 TMADAOH: 0.054 $Na_2O$: 0.081 $K_2O$: $18H_2O$.

This raw material composition was sealed in an 80 cc stainless steel autoclave, and heated for 72 hours at 150° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was a pure chabazite-type zeolite, i.e., a single phase of chabazite-type zeolite. The $SiO_2/Al_2O_3$ molar ratio of this chabazite-type zeolite was 14.9. With respect to this chabazite-type zeolite, 150 crystal particle images were selected at random from three view fields photographed at a 5.000-fold magnification by SEM, and the particle size (hereinafter referred to as "SEM particle size") obtained as the arithmetic average of the respective particle sizes was 1.54 μm. Pure water was added to the chabazite-type zeolite to prepare a slurry of 1% solid content, and measurement of particle size distribution (volumetric distribution) was conducted by laser diffraction and scattering method after conducting ultrasonic dispersion treatment for 2 minutes. As a result, with respect to the obtained chabazite-type zeolite, the 10% particle size was 1.54 μm, the 50% particle size was 2.36 μm, and the 90% particle size was 3.39 μm. This chabazite-type zeolite was considered as Zeolite 1.

The following Table 1 shows a comparison of the X-ray diffraction pattern of chabazite-type zeolite (U.S. Pat. No. 4,544,538) and the X-ray diffraction pattern of the product obtained in Example 1.

TABLE 1

| X-ray diffraction pattern of chabazite-type zeolite (U.S. Pat. No. 4,544,538) | | X-ray diffraction pattern of product of Example 1 (110° C., dried product) | |
| --- | --- | --- | --- |
| Lattice spacing d (Å) | Relative intensity | Lattice spacing d (Å) | Relative intensity |
| 9.24 | 61 | 9.19 | 62 |
| 6.30 | 21 | 6.27 | 18 |
| 5.46 | 80 | 5.45 | 72 |
| 4.98 | 24 | 4.96 | 28 |
| 4.26 | 100 | 4.25 | 100 |
| 4.01 | 9 | 4.00 | 8 |
| 3.91 | 8 | 3.91 | 7 |
| 3.56 | 69 | 3.55 | 53 |
| 3.589 | 18 | 3.39 | 17 |
| 2.885 | 47 | 2.89 | 48 |
| 2.859 | 21 | 2.85 | 27 |

Example 2 (Production of Zeolite 2)

11.1 g of a 25% TMADAOH aqueous solution, 35.2 g of pure water, 1.2 g of a 48% potassium hydroxide aqueous solution, and 9.6 g of amorphous aluminosilicate gel prepared from sodium silicate and aluminum sulfate were added together and the ingredients were sufficiently mixed to obtain a raw material composition. The composition of the raw material composition was $SiO_2$: 0.063 $Al_2O_3$: 0.098 TMADAOH: 0.065 $Na_2O$: 0.036 $K_2O$: $18H_2O$.

This raw material composition was sealed in an 80 cc stainless steel autoclave, and heated for 48 hours at 170° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 14.2.

This chabazite-type zeolite was subjected to observation by SEM and particle size distribution measurement in the same manner as Example 1. As a result, with respect to this chabazite-type zeolite, the SEM particle size was 1.03 μm, the 10% particle size was 1.54 μm, the 50% particle size was 3.94 μm, and the 90% particle size was 7.14 μm. This chabazite-type zeolite was considered as Zeolite 2.

Example 3 (Production of Zeolite 3)

9.3 g of a 25% TMADAOH aqueous solution, 36.2 g of pure water, 0.4 g of a 48% sodium hydroxide aqueous solution, 2.0 g of a 48% potassium hydroxide aqueous solution, and 9.2 g of amorphous aluminosilicate gel subjected to Na removal treatment were added together and the ingredients were sufficiently mixed to obtain a raw material composition. The composition of the raw material composition was $SiO_2$: 0.065 $Al_2O_3$: 0.081 TMADAOH: 0.02 $Na_2O$: 0.063 $K_2O$: 18$H_2O$.

This raw material composition was sealed in an 80 cc stainless steel autoclave, and heated for 70 hours at 150° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 14.4. This chabazite-type zeolite was subjected to observation by SEM and particle size distribution measurement in the same manner as Example 1. As a result, with respect to this chabazite-type zeolite, the SEM particle size was 1.90 μm, the 10% particle size was 2.76 μm, the 50% particle size was 5.37 μm, and the 90% particle size was 9.07 μm. This chabazite-type zeolite was considered as Zeolite 3.

Example 4 (Production of Zeolite 4)

9.3 g of a 25% TMADAOH aqueous solution, 36.2 g of pure water, 0.9 g of a 48% sodium hydroxide aqueous solution, 1.4 g of a 48% potassium hydroxide aqueous solution, and 9.3 g of amorphous aluminosilicate gel were added together and the ingredients were sufficiently mixed to obtain a raw material composition. The composition of the raw material composition was $SiO_2$: 0.076 $Al_2O_3$: 0.081 TMADAOH: 0.042 $Na_2O$: 0.042 $K_2O$: 18$H_2O$.

This raw material composition was sealed in an 80 cc stainless steel autoclave, and heated for 70 hours at 170° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 12.5. This chabazite-type zeolite was subjected to observation by SEM and particle size distribution measurement in the same manner as Example 1. As a result, with respect to this chabazite-type zeolite, the SEM particle size was 1.59 μm, the 10% particle size was 2.98 μm, the 50% particle size was 7.90 μm, and the 90% particle size was 20.7 μm. This chabazite-type zeolite was considered as Zeolite 4.

Example 5 (Production of Zeolite 5)

A product was obtained by the same method as Example 4, except that the $SiO_2/Al_2O_3$ molar ratio of the raw material composition was changed.

Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 14.4. This chabazite-type zeolite was subjected to observation by SEM and particle size distribution measurement in the same manner as Example 1. As a result, with respect to this chabazite-type zeolite, the SEM particle size was 2.23 μm, the 10% particle size was 4.65 μm, the 50% particle size was 9.22 μm, and the 90% particle size was 16.7 μm. This chabazite-type zeolite was considered as Zeolite 5.

Example 6 (Production of Zeolite 6)

A product was obtained by the same method as Example 3, except that crystallization temperature was set at 170° C.

Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 14.4. This chabazite-type zeolite was subjected to observation by SEM and particle size distribution measurement in the same manner as Example 1. As a result, with respect to this chabazite-type zeolite, the SEM particle size was 2.67 μm, the 10% particle size was 4.18 μm, the 50% particle size was 9.16 μm, and the 90% particle size was 17.9 μm. This chabazite-type zeolite was considered as Zeolite 6.

Example 7 (Production of Zeolite 7)

A product was obtained by the same method as Example 3, except that crystallization temperature was set at 180° C.

Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 14.8. This chabazite-type zeolite was subjected to observation by SEM and particle size distribution measurement in the same manner as Example 1. As a result, with respect to this chabazite-type zeolite, the SEM particle size was 3.50 μm, the 10% particle size was 5.95 μm, the 50% particle size was 10.7 μm, and the 90% particle size was 19.0 μm. This chabazite-type zeolite was considered as Zeolite 7.

Example 8 (Production of Zeolite 8)

589 g of a 25% TMADAOH aqueous solution, 2270 g of pure water, 27 g of a 48% sodium hydroxide aqueous solution, 127 g of a 48% potassium hydroxide aqueous solution, and 582 g of amorphous aluminosilicate gel were added together and the ingredients were sufficiently mixed to obtain a raw material composition. The composition of the raw material composition was $SiO_2$: 0.072 $Al_2O_3$: 0.081 TMADAOH: 0.021 $Na_2O$: 0.063 $K_2O$: 18$H_2O$.

This raw material composition was sealed in a 4 L stainless steel autoclave, and heated for 91 hours at 150° C. under direct agitation. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 13.4. This chabazite-type zeolite was subjected to observation by SEM and particle size distribution measurement in the same manner as Example 1. As a result, with respect to this chabazite-type zeolite, the SEM particle size was 2.34 μm, the 10% particle size was 2.69 μm, the 50% particle size was 6.38 μm, and the 90% particle size was 9.96 μm. This chabazite-type zeolite was considered as Zeolite 8.

Example 9 (Production of Zeolite 9)

8.3 g of a 25% TMADAOH aqueous solution, 37.0 g of pure water, 0.9 g of a 48% sodium hydroxide aqueous solution, 1.4 g of a 48% potassium hydroxide aqueous solution, and 9.4 g of amorphous aluminosilicate gel were added together and the ingredients were sufficiently mixed to obtain a raw material composition. The composition of the raw material composition was $SiO_2$: 0.076 $Al_2O_3$: 0.082 TMADAOH: 0.043 $Na_2O$: 0.043 $K_2O$: 18$H_2O$.

This raw material composition was sealed in an 80 cc stainless steel autoclave, and heated for 70 hours at 150° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 12.1. This chabazite-type zeolite was subjected to observation by SEM and particle size distribution measurement in the same manner as Example 1. As a result, with respect to this chabazite-type zeolite, the SEM particle size was 1.12 μm, the 10% particle size was 2.54 μm, the 50% particle size was 4.26 μm, and the 90% particle size was 8.04 μm. This chabazite-type zeolite was considered as Zeolite 9.

Example 10 (Production of Zeolite 10)

7.5 g of a 25% TMADAOH aqueous solution, 37.0 g of pure water, 1.0 g of a 48% sodium hydroxide aqueous solution, 1.4 g of a 48% potassium hydroxide aqueous solution, and 9.3 g of amorphous aluminosilicate gel were added together and the ingredients were sufficiently mixed to obtain a raw material composition. The composition of the raw material composition was $SiO_2$: 0.072 $Al_2O_3$: 0.065 TMADAOH: 0.044 $Na_2O$: 0.044 $K_2O$: 18$H_2O$.

This raw material composition was sealed in an 80 cc stainless steel autoclave, and heated for 70 hours at 150° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 13.3. This chabazite-type zeolite was subjected to observation by SEM and particle size distribution measurement in the same manner as Example 1. As a result, with respect to this chabazite-type zeolite, the SEM particle size was 1.50 μm, the 10% particle size was 2.74 μm, the 50% particle size was 5.56 μm, and the 90% particle size was 9.96 μm. This chabazite-type zeolite was considered as Zeolite 10.

Example 11 (Production of Zeolite 11)

A product was obtained by the same method as Example 10, except that the $SiO_2/Al_2O_3$ molar ratio of the raw material composition was changed to 12, and crystallization temperature was changed to 160° C.

Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 12.2. This chabazite-type zeolite was subjected to observation by SEM and particle size distribution measurement in the same manner as Example 1. As a result, with respect to this chabazite-type zeolite, the SEM particle size was 1.41 μm, the 10% particle size was 3.23 μm, the 50% particle size was 5.84 μm, and the 90% particle size was 24.5 μm. This chabazite-type zeolite was considered as Zeolite 11.

Example 12 (Production of Zeolite 12)

6.9 g of a 25% TMADAOH aqueous solution, 38.2 g of pure water, 1.0 g of a 48% sodium hydroxide aqueous solution, 1.5 g of a 48% potassium hydroxide aqueous solution, and 9.4 g of amorphous aluminosilicate gel were added together and the ingredients were sufficiently mixed to obtain a raw material composition. The composition of the raw material composition was $SiO_2$: 0.082 $Al_2O_3$: 0.060 TMADAOH: 0.046 $Na_2O$: 0.046 $K_2O$: 18$H_2O$.

This raw material composition was sealed in an 80 cc stainless steel autoclave, and heated for 70 hours at 150° C. while rotation was conducted at 55 rpm. The product after heating was subjected to solid-liquid separation, washed with a sufficient amount of pure water, and dried at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 11.8. This chabazite-type zeolite was subjected to observation by SEM and particle size distribution measurement in the same manner as Example 1. As a result, with respect to this chabazite-type zeolite, the SEM particle size was 1.45 μm, the 10% particle size was 3.11 μm, the 50% particle size was 5.64 μm, and the 90% particle size was 38.2 μm. This chabazite-type zeolite was considered as Zeolite 12.

Comparative Example 1 (Production of Comparative Zeolite 1)

Referencing the method disclosed in Example 2 of U.S. Pat. No. 4,544,538, chabazite-type zeolite was produced in the following manner.

14.7 g of sodium silicate aqueous solution No. 3 ($SiO_2$: 29.3%, $Na_2O$: 9.2%), 19.6 g of a 20% N,N,N-trimethyladamantyl ammonium bromide (hereinafter referred to as "TMADABr") aqueous solution, and 2.1 g of pure water were mixed together to prepare an aqueous solution (the obtained aqueous solution was considered as "aqueous solution A"). Next, 1.4 g of aluminum sulfate aqueous solution ($Al_2O_3$: 8.0%) and 2.0 g of a 48% sodium hydroxide aqueous solution were added to 17.1 g of pure water to prepare an aqueous solution (the obtained aqueous solution was considered as "aqueous solution B"). Aqueous solution B was added to aqueous solution A, and the solution was agitated until the solution was homogenous to obtain a raw material composition. The composition of the raw material composition was $SiO_2$: 0.016 $Al_2O_3$: 0.20 TMADABr: 0.47 $Na_2O$: 36$H_2O$.

This raw material composition was sealed in an 80 cc stainless steel autoclave, and heated for 144 hours at 140° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 8.9. This chabazite-type zeolite was subjected to observation by SEM and particle size distribution measurement in the same manner as Example 1. As a result, with respect to this chabazite-type zeolite, the SEM particle size was 8.78 μm, the 10% particle size was 8.06 μm, the 50% particle size was 14.46 μm, and the 90% particle size was 32.66 μm. This chabazite-type zeolite was considered as Comparative Zeolite 1.

Comparative Example 2 (Production of Comparative Zeolite 2)

Referencing the method disclosed in Example 7 of U.S. Pat. No. 4,544,538, chabazite-type zeolite was produced in the following manner.

14.9 g of sodium silicate aqueous solution No. 3, 12.8 g of a 20% TMADABr aqueous solution, and 7.9 g of pure water were mixed together to prepare an aqueous solution (the obtained aqueous solution was considered as "aqueous solution A2"). Next, 3.3 g of aluminum sulfate aqueous solution and 2.1 g of a 48% sodium hydroxide aqueous solution were added to 16.0 g of pure water to prepare an aqueous solution (the obtained aqueous solution was considered as "aqueous solution B2"). Aqueous solution B2 was added to aqueous solution A2, and the solution was agitated until the solution was homogenous to obtain a raw material composition. The composition of the raw material composition was $SiO_2$: 0.036 $Al_2O_3$: 0.13 TMADABr: 0.47 $Na_2O$: $36H_2O$.

This raw material composition was sealed in an 80 cc stainless steel autoclave, and heated for 144 hours at 140° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 10.7. This chabazite-type zeolite was subjected to observation by SEM and particle size distribution measurement in the same manner as Example 1. As a result, with respect to this chabazite-type zeolite, the SEM particle size was 0.62 μm, the 10% particle size was 0.65 μm, the 50% particle size was 1.04 μm, and the 90% particle size was 1.55 μm. This chabazite-type zeolite was considered as Comparative Zeolite 2.

Comparative Example 3 (Production of Comparative Zeolite 3)

Chabazite-type zeolite was produced by the same method as Comparative Example 2, except that the $SiO_2/Al_2O_3$ molar ratio of the raw material composition was changed.

15.1 g of sodium silicate aqueous solution No. 3, 13.0 g of a 20% TMADABr aqueous solution, and 8.0 g of pure water were mixed together to prepare an aqueous solution (the obtained aqueous solution was considered as "aqueous solution A3"). Next, 0.6 g of aluminum sulfate aqueous solution and 2.1 g of a 48% sodium hydroxide aqueous solution were added to 18.2 g of pure water to prepare an aqueous solution (the obtained aqueous solution was considered as "aqueous solution B3"). Aqueous solution B3 was added to aqueous solution A3, and the solution was agitated until the solution is homogenous to obtain a raw material composition. The composition of the raw material composition was $SiO_2$: 0.007 $Al_2O_3$: 0.13 TMADABr: 0.47 $Na_2O$: $36H_2O$.

This raw material composition was sealed in an 80 cc stainless steel autoclave, and heated for 144 hours at 140° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 9.9. This chabazite-type zeolite was subjected to observation by SEM and particle size distribution measurement in the same manner as Example 1. As a result, with respect to this chabazite-type zeolite, the SEM particle size was 14.04 μm, the 10% particle size was 18.42 μm, the 50% particle size was 47.48 μm, and the 90% particle size was 86.32 μm. This chabazite-type zeolite was considered as Comparative Zeolite 3.

Comparative Example 4 (Production of Comparative Zeolite 4)

Referencing the method disclosed in U.S. Pat. No. 4,665,110, chabazite-type zeolite was produced in the following manner.

17.9 g of a 13% TMADAOH aqueous solution, 27.2 g of pure water, 0.9 g of a 48% sodium hydroxide aqueous solution, 0.29 g of aluminum hydroxide, and 3.7 g of amorphous silica powder (manufactured by Tosoh Silica Corporation; trade name: Nipsil VN-3) were added together and the ingredients were sufficiently mixed to obtain a raw material composition. The composition of the raw material composition was $SiO_2$: 0.036 $Al_2O_3$: 0.20 TMADAOH: 0.10 $Na_2O$: $44H_2O$.

This raw material composition was sealed in an 80 cc stainless steel autoclave, and heated for 158 hours at 150° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 22.3. This chabazite-type zeolite was subjected to observation by SEM and particle size distribution measurement in the same manner as Example 1. As a result, with respect to this chabazite-type zeolite, the SEM particle size was 0.48 μm, the 10% particle size was 0.71 μm, the 50% particle size was 1.25 μm, and the 90% particle size was 2.64 μm. This chabazite-type zeolite was considered as Comparative Zeolite 4.

Comparative Example 5 (Production of Comparative Zeolite 5)

Chabazite-type zeolite was produced by the same method as Comparative Example 4, except that the $SiO_2/Al_2O_3$ molar ratio of the raw material composition was changed.

Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 13.8. This chabazite-type zeolite was subjected to observation by SEM and particle size distribution measurement in the same manner as Example 1. As a result, with respect to this chabazite-type zeolite, the SEM particle size was 0.36 µm, the 10% particle size was 0.35 µm, the 50% particle size was 0.59 µm, and the 90% particle size was 8.21 µm. This chabazite-type zeolite was considered as Comparative Zeolite 5.

Comparative Example 6 (Production of Comparative Zeolite 6)

9.2 g of a 25% TMADAOH aqueous solution, 35.3 g of pure water, 3.4 g of a 48% potassium hydroxide aqueous solution, and 9.2 g of amorphous aluminosilicate gel that was subjected to Na removal treatment were added together and the ingredients were sufficiently mixed to obtain a raw material composition. The composition of the raw material composition was $SiO_2$: 0.076 $Al_2O_3$: 0.081 TMADAOH: 0.106 $K_2O$: $18H_2O$.

This raw material composition was sealed in an 80 cc stainless steel autoclave, and heated for 70 hours at 150° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction, the product was a mixture of chabazite and merlinoite.

Comparative Example 7 (Production of Comparative Zeolite 7)

9.4 g of a 25% TMADAOH aqueous solution, 36.1 g of pure water, 2.2 g of a 48% potassium hydroxide aqueous solution, and 9.3 g of amorphous aluminosilicate gel that was subjected to Na removal treatment were added together and the ingredients were sufficiently mixed to obtain a raw material composition. The composition of the raw material composition was $SiO_2$: 0.082 $Al_2O_3$: 0.081 TMADAOH: 0.070 $K_2O$: $18H_2O$.

This raw material composition was sealed in an 80 cc stainless steel autoclave, and heated for 70 hours at 150° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 12.0. This chabazite-type zeolite was subjected to observation by SEM and particle size distribution measurement in the same manner as Example 1. As a result, with respect to this chabazite-type zeolite, the SEM particle size was 0.89 µm, the 10% particle size was 2.90 µm, the 50% particle size was 5.97 µm, and the 90% particle size was 10.9 µm. This chabazite-type zeolite was considered as Comparative Zeolite 7.

Comparative Example 8 (Production of Comparative Zeolite 8)

Referencing the method disclosed in Japanese Unexamined Patent Application, First Publication No. 2010-168269, chabazite-type zeolite was produced in the following manner.

11.2 g of a 25% TMADAOH aqueous solution, 35.1 g of pure water, 1.4 g of a 48% potassium hydroxide aqueous solution, and 9.4 g of amorphous aluminosilicate gel were added together and the ingredients were sufficiently mixed to obtain a raw material composition. The composition of the raw material composition was $SiO_2$: 0.050 $Al_2O_3$: 0.098 TMADAOH: 0.058 $Na_2O$: 0.044 $K_2O$: $18H_2O$.

This raw material composition was sealed in an 80 cc stainless steel autoclave, and heated for 70 hours at 150° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 17.9. This chabazite-type zeolite was subjected to observation by SEM and particle size distribution measurement in the same manner as Example 1. As a result, with respect to this chabazite-type zeolite, the SEM particle size was 1.50 µm, the 10% particle size was 1.66 µm, the 50% particle size was 3.31 µm, and the 90% particle size was 5.70 µm. This chabazite-type zeolite was considered as Comparative Zeolite 8.

Comparative Example 9 (Production of Comparative Zeolite 9)

Referencing the method disclosed in U.S. Pat. No. 4,503,024, chabazite-type zeolite was produced in the following manner.

To a 128.6 g of pure water, 16.1 g of 48% potassium hydroxide aqueous solution and 15.3 g of Y-type zeolite (manufactured by Tosoh Corporation, trade name: HSZ-320HOA) were added, and the ingredients were sufficiently mixed to obtain a raw material composition. The composition of the raw material composition was $SiO_2$: 0.18 $Al_2O_3$: 0.06 $Na_2O$: 0.39 $K_2O$: $43H_2O$.

This raw material composition was sealed in a 200 cc stainless steel autoclave, and heated for 96 hours at 95° C. while held stationary. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 4.5. This chabazite-type zeolite was subjected to observation by SEM and particle size distribution measurement in the same manner as Example 1. As a result of observation by SEM, it was clear that this chabazite-type zeolite consisted of aggregates of fine particles of less than 0.5 µm. Consequently, measurement of SEM particle size was not conducted. The 10% particle size was 4.90 µm, the 50% particle size was 7.47 µm, and the 90% particle size was 21.8 µm. This chabazite-type zeolite was considered as Comparative Zeolite 9.

Comparative Example 10 (Production of Comparative Zeolite 10)

Referencing the method disclosed in US patent 2011/020204A1, chabazite-type zeolite was produced in the following manner.

125.2 g of pure water, 19.6 g of 48% potassium hydroxide aqueous solution, and 15.2 g of Y-type zeolite (manufactured by Tosoh Corporation, trade name: HSZ-320HOA) were added together and the ingredients were sufficiently mixed to obtain a raw material composition. The composition of the raw material composition was $SiO_2$: 0.18 $Al_2O_3$: 0.06 $Na_2O$: 0.48 $K_2O$: 43$H_2O$.

This raw material composition was sealed in a 200 cc stainless steel autoclave, and heated for 96 hours at 95° C. while rotation was conducted at 55 rpm. The product after heating was subjected to solid-liquid separation, the obtained solid phase was washed with a sufficient amount of pure water, and drying was conducted at 110° C. to obtain a product. Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was 4.4. This chabazite-type zeolite was subjected to observation by SEM and particle size distribution measurement in the same manner as Example 1. As a result of observation by SEM, it was clear that this chabazite-type zeolite consisted of aggregates of fine particles of less than 0.5 μm. Consequently, measurement of SEM particle size was not conducted. With respect to this chabazite-type zeolite, the 10% particle size was 4.77 μm, the 50% particle size was 7.32 μm, and the 90% particle size was 22.0 μm. This chabazite-type zeolite was considered as Comparative Zeolite 10.

The raw material compositions and products of Examples 1-12 and Comparative Examples 1-10 are shown in the following Table 2. Moreover, Table 3 shows the $SiO_2/Al_2O_3$ molar ratios, the particle sizes obtained from particle size distribution measurement, and the particle sizes quantitated from SEM photographs pertaining to the products.

TABLE 2

| Example | $SiO_2/Al_2O_3$ molar ratio | TMADAOH or TMADABr/$SiO_2$ molar ratio | $H_2O/SiO_2$ molar ratio | Alkali metal | Product |
|---|---|---|---|---|---|
| Example 1 | 21 | 0.124 | 18 | Na, K | Chabazite |
| Example 2 | 16 | 0.098 | 18 | Na, K | Chabazite |
| Example 3 | 15 | 0.081 | 18 | Na, K | Chabazite |
| Example 4 | 13 | 0.081 | 18 | Na, K | Chabazite |
| Example 5 | 15 | 0.081 | 18 | Na, K | Chabazite |
| Example 6 | 15 | 0.081 | 18 | Na, K | Chabazite |
| Example 7 | 15 | 0.081 | 18 | Na, K | Chabazite |
| Example 8 | 14 | 0.081 | 18 | Na, K | Chabazite |
| Example 9 | 12 | 0.072 | 18 | Na, K | Chabazite |
| Example 10 | 14 | 0.065 | 18 | Na, K | Chabazite |
| Example 11 | 12 | 0.065 | 18 | Na, K | Chabazite |
| Example 12 | 12 | 0.060 | 18 | Na, K | Chabazite |
| Comparative Example 1 | 63 | 0.200 | 36 | Na | Chabazite |
| Comparative Example 2 | 28 | 0.130 | 36 | Na | Chabazite |
| Comparative Example 3 | 143 | 0.130 | 36 | Na | Chabazite |
| Comparative Example 4 | 28 | 0.200 | 44 | Na | Chabazite |
| Comparative Example 5 | 16 | 0.200 | 44 | Na | Chabazite |
| Comparative Example 6 | 13 | 0.081 | 18 | K | Chabazite-merlinoite |
| Comparative Example 7 | 12 | 0.081 | 18 | K | Chabazite |
| Comparative Example 8 | 20 | 0.098 | 18 | Na, K | Chabazite |
| Comparative Example 9 | 5.7 | — | 43 | Na, K | Chabazite |
| Comparative Example 10 | 5.7 | — | 43 | Na, K | Chabazite |

TABLE 3

| Zeolite | $SiO_2/Al_2O_3$ molar ratio | SEM particle size (μm) | 10% particle size (μm) | 50% particle size (μm) | 90% particle size (μm) |
|---|---|---|---|---|---|
| Zeolite 1 | 14.9 | 1.54 | 1.54 | 2.36 | 3.39 |
| Zeolite 2 | 14.2 | 1.03 | 1.54 | 3.94 | 7.14 |
| Zeolite 3 | 14.4 | 1.90 | 2.76 | 5.37 | 9.07 |
| Zeolite 4 | 12.5 | 1.59 | 2.98 | 7.90 | 20.7 |
| Zeolite 5 | 14.4 | 2.23 | 4.65 | 9.22 | 16.7 |
| Zeolite 6 | 14.4 | 2.67 | 4.18 | 9.16 | 17.9 |
| Zeolite 7 | 14.8 | 3.50 | 5.95 | 10.7 | 19.0 |
| Zeolite 8 | 13.4 | 2.34 | 2.69 | 6.38 | 9.96 |
| Zeolite 9 | 12.1 | 1.12 | 2.54 | 4.26 | 8.04 |
| Zeolite 10 | 13.3 | 1.50 | 2.74 | 5.56 | 9.96 |
| Zeolite 11 | 12.2 | 1.41 | 3.23 | 5.84 | 24.5 |
| Zeolite 12 | 11.8 | 1.45 | 3.11 | 5.64 | 38.2 |
| Comparative Zeolite 1 | 8.9 | 8.78 | 8.06 | 14.5 | 32.7 |
| Comparative Zeolite 2 | 10.7 | 0.62 | 0.65 | 1.04 | 1.55 |
| Comparative Zeolite 3 | 9.9 | 14.0 | 18.4 | 47.5 | 86.3 |
| Comparative Zeolite 4 | 22.3 | 0.48 | 0.71 | 1.25 | 2.64 |
| Comparative Zeolite 5 | 13.8 | 0.36 | 0.35 | 0.59 | 8.21 |
| Comparative Zeolite 7 | 12.0 | 0.89 | 2.90 | 5.97 | 11.0 |
| Comparative Zeolite 8 | 17.9 | 1.50 | 1.66 | 3.31 | 5.70 |
| Comparative Zeolite 9 | 4.5 | Less than 0.5 | 4.90 | 7.47 | 21.9 |
| Comparative Zeolite 10 | 4.4 | Less than 0.5 | 4.77 | 7.32 | 22.0 |

Example 13 (Hydrothermal Resistance Test)

After calcinating the dry powders of Zeolite 10 and Comparative Zeolite 5 for 2 hours at 600° C. during air flow, each powder was press-molded and then grind to obtain a powder regulated to a 12-20 mesh. An ordinary-pressure fixed-bed flow-type reaction tube was filled with 3 ml of the zeolite, and treated for 1 hour at 900° C. under circulation at 300 ml/min of air containing 10 volume % of moisture. The heat resistance of zeolite was evaluated in terms of crystallinity after hydrothermal durability treatment. Crystallinity was computed as a peak intensity ratio by measuring powder X-ray diffraction, and by using the state prior to hydrothermal durability treatment as 100 at the diffraction peak of d=4.25 shown in Table 1. Table 4 shows crystallinity (%) after each hydrothermal durability treatment. It is shown that the chabazite-type zeolite of the present invention has a higher retention of crystallinity, and better heat resistance than conventional chabazite-type zeolite.

TABLE 4

| Zeolite | Crystallinity (%; against untreated) 900° C., 1 hr after treatment |
|---|---|
| Zeolite 10 | 57 |
| Comparative Zeolite 5 | 39 |

In the following examples, examples and comparative examples of copper loaded chabazite-type zeolites among the aforementioned chabazite-type zeolites are shown.

All measurements were carried out by the method shown below.

(Method for Measuring Average Particle Size)

Measurement of average particle size was conducted by observation by SEM in the same manner as Example 1. Selection of 150 crystal particle images was conducted at random from the SEM photographs of three view fields photographed at a 5.000-fold magnification, and the respective particle sizes were averaged to obtain the particle size (hereinafter referred to as "SEM particle size").

(Method for Calculating Atomic Ratio of Copper to Aluminum by the ICP Composition Analysis Method)

A 500 ml measuring flask was charged with 10 ml of 60% nitric acid and 10 ml of hydrofluoric acid, and alignment with the marked line was conducted by adding pure water to prepare the cleaning solution. 30 mg of chabazite-type zeolite was put into a 100 ml measuring flask, and alignment with the marked line was conducted by adding the prepared cleaning solution—this was used as the ICP analysis solution.

The Cu molar concentration obtained by conducting ICP composition analysis was divided by the Al molar concentration to obtain the atomic ratio of copper to aluminum.

(Method for Measuring NOx Reduction Rate (%))

Measurement of the NOx reduction rate (%) was conducted in the case where gas was contacted at a prescribed temperature under the following conditions. SCR catalysts are generally evaluated using gas which contains an ammonia as reducing agent and NOx that is to be reductively decomposed at 1:1. The NOx reduction conditions used in the present invention do not include any particular special conditions, and fall within the range of the general conditions used to evaluate the NOx reduceability of ordinary SCR catalysts.

NOx reduction conditions adopted for evaluation of the present invention:

| Composition of treated gas: | NO | 200 ppm |
| | $NH_3$ | 200 ppm |
| | $O_2$ | 10 volume % |
| | $H_2O$ | 3 volume % |
| | $N_2$ | balance |
| Flow rate of treated gas: | | 1.5 liters/minute |
| Space velocity: | | 60,000 $hr^{-1}$ |

With respect to the measurement procedure, copper-loaded chabazite was pressed molded, after which pulverization was performed, and granulation was conducted to a 12-20 mesh. Each of the granulated zeolites were subjected to hydrothermal durability treatment by the same method as Example 13. An ordinary-pressure fixed-bed flow-type reaction tube was filled with 1.5 ml of the copper-loaded chabazite after hydrothermal durability treatment. Evaluation was conducted of regular NOx removal activity at an optional temperature from 150° C. to 500° C. while gas of the aforementioned composition was being circulated at 1500 ml/min on a catalytic layer.

NOx removal activity is expressed by the following formula.

$$X_{NOx} = \{([NOx]_{in} - [NOx]_{out})/[NOx]_{in}\} \times 100 \quad \text{Formula 1}$$

Here, $X_{NOx}$ indicates the NOx reductive removal rate (%), $[NOx]_{in}$ indicates the NOx concentration of gas that is introduced, and $[NOx]_{out}$ indicates the NOx concentration of gas that is discharged.

Example 14 (Manufacture of Chabazite-Type Zeolite and Copper Loading)

As a structure-directing agent, a 25.1% N,N,N-trimethyl-adamantyl ammonium hydroxide aqueous solution was used. 39.4 g of this structure-directing agent, 87.1 g of pure water, 8.52 g of a 48% potassium hydroxide aqueous solution, 1.97 g of a 48% sodium hydroxide aqueous solution, and 103.1 g of amorphous aluminosilicate gel prepared from sodium silicate and aluminum sulfate were sufficiently mixed together to obtain a raw material composition. This raw material composition was $SiO_2$: 0.065 $Al_2O_3$: 0.08 TMADAOH: 0.04 $Na_2O$: 0.13 $K_2O$: $18H_2O$.

This raw material composition was put into a stainless steel autoclave, and heated for 70 hours at 170° C. The product after heating was subjected to solid-liquid separation, the obtained solid phase was washed with a sufficient amount of pure water, and drying was conducted at 110° C. to obtain a solid product. As a result of fluorescent X-ray analysis of the obtained solid product, the $SiO_2/Al_2O_3$ molar ratio was found to be 14.4.

The X-ray diffraction pattern of the zeolite is shown in the following Table 5.

TABLE 5

X-ray diffraction pattern of the zeolite obtained in Example 14 (110° C., dried product)

| Lattice spacing (Å) | Relative intensity |
| --- | --- |
| 9.00 | 50 |
| 6.18 | 14 |
| 5.39 | 67 |
| 4.90 | 23 |
| 4.21 | 100 |
| 3.97 | 7 |
| 3.88 | 7 |
| 3.52 | 44 |
| 3.37 | 18 |
| 2.87 | 53 |
| 2.84 | 22 |

This X-ray diffraction pattern was identical to the X-ray diffraction pattern of Table 1 of Japanese Unexamined Patent Application, First Publication Number 2010-168269. Consequently, it was ascertained that this zeolite was chabazite-type zeolite. The SEM particle size of this chabazite-type zeolite was 2.67 µm. Particle size distribution measurement was conducted in the same manner as Example 1. As a result, with respect to this chabazite-type zeolite, the 10% particle size was 4.18 µm, the 50% particle size was 9.16 µm, and the 90% particle size was 17.9 µm.

After converting this chabazite-type zeolite to $NH_4^+$-type chabazite-type zeolite by exchanging $NH_4^+$, it was heated for one hour at 500° C. to obtain $H^+$-type chabazite-type zeolite.

(Copper Loading)

After injecting 0.95 g of copper acetate monohydrate into 80 g of pure water, agitation was conducted for 10 minutes at 200 rpm to prepare a copper acetate aqueous solution. 5.45 g of the aforementioned $H^+$-type chabazite-type zeolite (weight at one hour of drying at 600° C.; hereinafter referred to as "dry base") was injected into this copper acetate aqueous solution, and agitation was conducted for 2 hours at 30° C. at 200 rpm, after which solid-liquid separation was conducted. The solid phase obtained by solid-liquid separation was washed with 400 g of warm pure water, and was dried overnight at 110° C. to produce a catalyst. As a result of ICP composition analysis of the obtained catalyst, the atomic ratio of copper to aluminum was 0.30, and the $SiO_2/Al_2O_3$ molar ratio was 14.5.

(Hydrothermal Durability Treatment)

Hydrothermal durability treatment was conducted by the same method as Example 13. Dry powder of the obtained catalyst was pressure molded, after which it was grind, and granulated to a 12-20 mesh. An ordinary-pressure fixed-bed flow-type reaction tube was filled with 3 ml of the granulated zeolite, and treated for one hour at 900° C. while circulating air containing 10 volume % of moisture at 300 ml/min.

(Measurement of NOx Reduction Rate (%))

Performed by the method described above. The NOx reduction rate of the catalyst was measured by adding a supply gas mixture composed of 200 ppm of NO, 200 ppm of $NH_3$, 10% $O_2$, 3% $H_2O$, and with the balance consisting of $N_2$ to an ordinary-pressure fixed-bed flow-type reaction vessel containing the catalyst that was subjected to hydrothermal durability treatment. Reaction was conducted at a space velocity of 60,000 hours$^{-1}$ across a temperature range from 150° C. to 500° C. The NOx reduction rate was computed by dividing the concentration of NO that was reductively removed after passing over the catalytic layer by the concentration of NO in the supply gas.

Example 15 (Production of Chabazite-Type Zeolite and Copper Loading)

Chabazite-type zeolite was produced by the same method as Example 14, except that the raw material composition was heated for 70 hours at 150° C.

Based on powder X-ray diffraction and fluorescent X-ray analysis, the product was pure chabazite-type zeolite, i.e., a single phase of chabazite-type zeolite. The $SiO_2/Al_2O_3$ molar ratio of this chabazite-type zeolite was found to be 14.4. The SEM particle size of this chabazite-type zeolite was 1.90 μm. Upon conducting particle size distribution measurement in the same manner as Example 1, the 10% particle size of this chabazite-type zeolite was 2.76 μm, its 50% particle size was 5.37 μm, and its 90% particle size was 9.07 μm.

After converting this chabazite-type zeolite to $NH_4^+$-type chabazite-type zeolite by exchanging $NH_4^+$, it was heated for one hour at 500° C. to obtain H$^+$-type chabazite-type zeolite.

(Copper Loading)

After injecting 2.84 g of copper acetate monohydrate into 80 g of pure water, agitation was conducted for 10 minutes at 200 rpm to prepare a copper acetate aqueous solution. 5.45 g of the aforementioned H$^+$-type chabazite-type zeolite (dry base) was injected into this copper acetate aqueous solution, and agitation was conducted for 2 hours at 30° C. at 200 rpm, after which solid-liquid separation was conducted. The solid phase obtained by solid-liquid separation was washed with 400 g of warm pure water, and was dried overnight at 110° C. to produce a catalyst. As a result of ICP composition analysis of the obtained catalyst, the atomic ratio of copper to aluminum was 0.28, and the $SiO_2/Al_2O_3$ molar ratio was 14.5.

(Hydrothermal Durability Treatment and Measurement of NOx Reduction Rate (%))

Next, by the same method that was summarily described in Example 14, the catalyst was pressure molded, granulated, and subjected to hydrothermal durability treatment, after which the NOx reduction rate was measured.

Example 16 (Copper Loading)

A catalyst was produced by the same method as Example 14, except that 0.52 g of copper acetate monohydrate and 5.00 g of H$^+$-type chabazite-type zeolite were used when loading copper. As a result of ICP composition analysis of the obtained catalyst, the atomic ratio of copper to aluminum was 0.25.

Next, by the same method as Example 14, the catalyst was pressure molded, granulated, and subjected to hydrothermal durability treatment, after which the NOx reduction rate (%) was measured.

Example 17 (Copper Loading)

A catalyst was produced by the same method as Example 15, except that a copper acetate aqueous solution prepared with half (1.42 g) of the amount of copper acetate monohydrate was used. As a result of TCP composition analysis of the obtained catalyst, the atomic ratio of copper to aluminum was 0.32.

Next, by the same method as Example 14, the catalyst was pressure molded, granulated, and subjected to hydrothermal durability treatment, after which the NOx reduction rate (%) was measured.

Example 18 (Copper Loading)

A catalyst was produced in the same manner as Example 15, except that Zeolite 7 (Example 7) was used as the copper-loaded zeolite.

Dry powder of Zeolite 7 was calcinated for 2 hours at 600° C. with air flow. Ion exchange treatment was conducted by inputting an aqueous solution obtained by dissolving an excessive amount of ammonium chloride to the aluminum content in the zeolite. After ion exchange treatment, solid-liquid separation was conducted, the obtained solid phase was washed with a sufficient amount of pure water, and drying was conducted at 110° C. The obtained dry powder was subjected to fluorescent X-ray analysis, and it was confirmed that Na or K had been removed to the lower limit of detection of fluorescent X-ray analysis ($Na_2O$, $K_2O \leq 0.01$ wt %). This $NH_4^+$-type chabazite-type zeolite was calcinated for 1 hour at 500° C. to obtain H$^+$-type chabazite-type zeolite.

After inputting 0.95 g of copper acetate monohydrate into 80 g of pure water, agitation was conducted for 10 minutes at 200 rpm to produce a copper acetate aqueous solution. 5.45 g (dry base) of the aforementioned H$^+$-type chabazite-type zeolite was input into the copper acetate aqueous solution, and agitation was conducted for 2 hours at 30° C. at 200 rpm to perform solid-liquid separation by Nutsche. The solid phase obtained by solid-liquid separation was washed with 400 g of warm pure water, and dried overnight at 110° C. to produce a catalyst. As a result of ICP composition analysis of the obtained catalyst, the atomic ratio of copper to aluminum was 0.24.

Next, by the same method as Example 14, the catalyst was pressure molded, granulated, and subjected to hydrothermal durability treatment, after which the NOx reduction rate (%) was measured.

Example 19 (Copper Loading)

A catalyst was produced in the same manner as Example 18, except that a copper acetate aqueous solution prepared with 1.5-fold (1.42 g) of the amount of copper acetate monohydrate was used. As a result of ICP composition analysis of the obtained catalyst, the atomic ratio of copper to aluminum was 0.29.

Next, by the same method as Example 14, the catalyst was pressure molded, granulated, and subjected to hydrothermal durability treatment, after which the NOx reduction rate (%) was measured.

Example 20 (Copper Loading)

A catalyst was produced in the same manner as Example 19, except that Zeolite 8 (Example 8) was used as the copper-loaded zeolite. As a result of ICP composition analysis of the obtained catalyst, the atomic ratio of copper to aluminum was 0.30.

Next, by the same method as Example 14, the catalyst was pressure molded, granulated, and subjected to hydrothermal durability treatment, after which the NOx reduction rate (%) was measured.

Example 21 (Copper Loading)

A catalyst was produced in the same manner as Example 19, except that Zeolite 10 (Example 10) was used as the copper-loaded zeolite. As a result of ICP composition analysis of the obtained catalyst, the atomic ratio of copper to aluminum was 0.24.

Next, by the same method as Example 14, the catalyst was pressure molded, granulated, and subjected to hydrothermal durability treatment, after which the NOx reduction rate (%) was measured.

Comparative Example 11 (Production of Chabazite-Type Zeolite and Copper Loading)

As copper-loaded zeolite, zeolite was synthesized by the method recorded in U.S. Pat. No. 4,665,110.

X-ray diffraction patterns of X-ray diffraction images of the obtained synthetic product were identical to the X-ray diffraction patterns recorded in U.S. Pat. No. 4,544,538. Consequently, it was ascertained that this zeolite is chabazite-type zeolite.

With respect to this chabazite-type zeolite, the SEM particle size was 0.48 μm, and the $SiO_2/Al_2O_3$ molar ratio was 22.3. Thus, with respect to the chabazite-type zeolite of Comparative Example 1, not only was it found that the SEM particle size is small, but also that the $SiO_2/Al_2O_3$ molar ratio is large compared to the chabazite-type zeolites of Examples 14 and 15.

After subjected to $NH_4^+$ exchange with respect to this chabazite-type zeolite, it was heated for 1 hour at 500° C. to produce $H^+$-type chabazite-type zeolite.

(Copper Loading)

After inputting 2.6 g of copper acetate monohydrate into 100 g of pure water, agitation was conducted for 10 minutes at 200 rpm to produce a copper acetate aqueous solution. 10.71 g (dry base) of the aforementioned $H^+$-type chabazite-type zeolite was input into the copper acetate aqueous solution, and agitation was conducted for 2 hours at 30° C. at 200 rpm to perform solid-liquid separation. The solid phase obtained by solid-liquid separation was washed with 400 g of warm pure water, and dried overnight at 110° C. to produce a catalyst. As a result of ICP composition analysis of the obtained catalyst, the atomic ratio of copper to aluminum was 0.37, and the $SiO_2/Al_2O_3$ molar ratio was 22.6.

(Hydrothermal Durability Treatment and Measurement of NOx Reduction Rate (%))

Next, by the same method as Example 14, the catalyst was pressure molded, granulated, and subjected to hydrothermal durability treatment, after which the NOx reduction rate (%) was measured.

Comparative Example 12 (Production of Chabazite-Type Zeolite and Copper Loading)

A catalyst was produced by the same method as Comparative Example 11, except that 6.0 g of copper acetate monohydrate was input into 200 g of pure water, after which agitation was conducted for 10 minutes at 200 rpm to produce a copper acetate aqueous solution.

With respect to the obtained chabazite-type zeolite, the SEM particle size was 0.48 μm, and the $SiO_2/Al_2O_3$ molar ratio was 22.3. Thus, with respect to the chabazite-type zeolite of Comparative Example 2, not only was it found that the SEM particle size is small, but also that the $SiO_2/Al_2O_3$ molar ratio is large compared to the chabazite-type zeolites of Examples 14 and 15.

After subjected to $NH_4^+$ exchange with respect to this chabazite-type zeolite, it was heated for 1 hour at 500° C. to produce $H^+$-type chabazite-type zeolite. A copper-loaded catalyst was obtained from this by the same method as Comparative Example 1. As a result of ICP composition analysis of the obtained catalyst, the atomic ratio of copper to aluminum was 0.41, and the $SiO_2/Al_2O_3$ molar ratio was 22.6.

(Hydrothermal Durability Treatment and Measurement of NOx Reduction Rate (%))

Next, by the same method as Example 14, the catalyst was pressure molded, granulated, and subjected to hydrothermal durability treatment, after which the NOx reduction rate (%) was measured.

Comparative Example 13 (Copper Loading)

A catalyst was produced in the same manner as Example 18, except that Comparative Zeolite 8 (Comparative Example 8) was used as the copper-loaded zeolite.

Dry powder of Comparative Zeolite 8 was calcinated for 2 hours at 600° C. with air flow. Ion exchange treatment was conducted by inputting an aqueous solution obtained by dissolving an excessive amount of ammonium chloride to the aluminum content in the zeolite. Solid-liquid separation was subsequently conducted, washing was conducted with a sufficient amount of pure water, and drying was conducted at 110° C. The obtained dry powder was subjected to fluorescent X-ray analysis, and it was confirmed that Na or K had been removed to the lower limit of detection of fluorescent X-ray analysis ($Na_2O$, $K_2O \leq 0.01$ wt %). This $NH_4^+$-type chabazite-type zeolite was calcinated for 1 hour at 500° C. to obtain $H^+$-type chabazite-type zeolite.

After inputting 1.54 g of copper acetate monohydrate into 200 g of pure water, agitation was conducted for 10 minutes at 200 rpm to produce a copper acetate aqueous solution. 18.6 g (dry base) of the aforementioned $H^+$-type chabazite-type zeolite was input into the copper acetate aqueous solution, and agitation was conducted for 2 hours at 30° C. at 200 rpm to perform solid-liquid separation. The solid phase obtained by solid-liquid separation was washed with 800 g of warm pure water, and dried overnight at 110° C. to produce a catalyst. As a result of ICP composition analysis of the obtained catalyst, the atomic ratio of copper to aluminum was 0.24.

Next, by the same method as Example 14, the catalyst was pressure molded, granulated, and subjected to hydrothermal durability treatment, after which the NOx reduction rate (%) was measured.

Comparative Example 14 (Copper Loading)

A catalyst was produced in the same manner as Comparative Example 13, except that a copper acetate aqueous solution prepared with 3-fold of the amount of copper acetate monohydrate was used. As a result of ICP composition analysis of the obtained catalyst, the atomic ratio of copper to aluminum was 0.30.

Next, by the same method as Example 14, the catalyst was pressure molded, granulated, and subjected to hydrothermal durability treatment, after which the NOx reduction rate (%) was measured.

Comparative Example 15 (Copper Loading)

A catalyst was produced in the same manner as Comparative Example 13, except that a copper acetate aqueous solution prepared with 10-fold of the amount of copper acetate monohydrate was used, and the temperature at which agitation was conducted after inputting H+-type chabazite-type zeolite into the copper acetate aqueous solution was 60° C. As a result of ICP composition analysis of the obtained catalyst, the atomic ratio of copper to aluminum was 1.02.

Next, by the same method as Example 14, the catalyst was pressure molded, granulated, and subjected to hydrothermal durability treatment, after which the NOx reduction rate (%) was measured.

Comparative Example 16 (Copper Loading)

Referencing the method disclosed in Example 1 of US Patent 2011/020204A1, a catalyst was produced using Comparative Zeolite 10 (Comparative Example 10) as the copper-loaded zeolite.

A slurry was obtained by adding 11 g of dry powder of Comparative Zeolite 10 to an aqueous solution obtained by dissolving 89 g of ammonium nitrate in 165 g of pure water. This slurry was agitated for 1 hour at 80° C., and ion exchange was conducted between the zeolite and $NH_4^+$-type chabazite-type zeolite. Subsequently, solid-liquid separation was conducted, and the obtained solid phase was washed with a sufficient amount of pure water. After repeating this ion exchange treatment three times, drying was conducted at 110° C. Fluorescent X-ray analysis of the obtained dry powder was conducted, and it was confirmed that Na or K had been removed to the lower limit of detection of fluorescent X-ray analysis ($Na_2O$, $K_2O$ 0.01 wt %). This $NH_4^+$-type chabazite-type zeolite was calcinated for 4 hours at 540° C. to obtain $H^+$-type chabazite-type zeolite.

A copper sulfate aqueous solution was produced by dissolving 1.02 g of copper sulfate pentahydrate in 50 g of pure water. 3.5 g of the aforementioned $H^+$-type chabazite-type zeolite was added to the copper sulfate aqueous solution, and agitation was conducted for 1 hour at 70° C. Subsequently, the solid phase obtained by solid-liquid separation was washed with 500 g of pure water, and dried overnight at 110° C. to produce a catalyst. As a result of ICP composition analysis of the obtained catalyst, the atomic ratio of copper to aluminum was 0.19.

Next, by the same method as Example 14, the catalyst was pressure molded, granulated, and subjected to hydrothermal durability treatment, after which the NOx reduction rate (%) was measured.

Example 19 (Copper Loading)

Table 6 shows the compositions and SEM particle sizes of the copper-loaded chabazites of Examples 14-21 and Comparative Examples 11-16, as well as their NOx removal rates (%) at 150° C. and 500° C. after hydrothermal durability treatment. It is shown that the chabazite-type zeolite of the present invention has higher NOx reductive removal activity and better hydrothermal durability than conventional chabazite-type zeolite.

TABLE 6

| | $SiO_2/Al_2O_3$ molar ratio | SEM particle size (μm) | 90% particle size (μm) | Cu/Al ratio | Cu (weight %) | NOx reduction rate after 1 hour of treatment at 900° C. (%) | |
|---|---|---|---|---|---|---|---|
| | | | | | | 150° C. | 500° C. |
| Example 14 | 14.4 | 2.67 | 17.9 | 0.30 | 3.6 | 68 | 80 |
| Example 15 | 14.4 | 1.90 | 9.07 | 0.28 | 3.5 | 54 | 78 |
| Example 16 | 14.4 | 2.67 | 17.9 | 0.25 | 3.0 | 63 | 83 |
| Example 17 | 14.4 | 1.90 | 9.07 | 0.32 | 4.0 | 57 | 74 |
| Example 18 | 14.8 | 3.50 | 19.0 | 0.24 | 3.0 | 66 | 82 |
| Example 19 | 14.8 | 3.50 | 19.0 | 0.29 | 3.5 | 68 | 80 |
| Example 20 | 13.4 | 2.34 | 9.96 | 0.30 | 4.1 | 61 | 79 |
| Example 21 | 13.3 | 1.50 | 9.96 | 0.24 | 3.6 | 63 | 84 |
| Comparative Example 11 | 22.3 | 0.48 | 2.64 | 0.37 | 3.1 | 51 | 76 |
| Comparative Example 12 | 22.3 | 0.48 | 2.64 | 0.41 | 3.4 | 40 | 53 |
| Comparative Example 13 | 17.9 | 1.50 | 5.70 | 0.24 | 2.3 | 41 | 83 |
| Comparative Example 14 | 17.9 | 1.50 | 5.70 | 0.30 | 3.5 | 51 | 60 |
| Comparative Example 15 | 17.9 | 1.50 | 5.70 | 1.02 | 5.3 | 0 | 16 |
| Comparative Example 16 | 4.4 | Less than 0.5 | 22.0 | 0.19 | 3.5 | 3 | 29 |

The present invention has been explained in detail with reference to specific examples, but it will be obvious to those skilled in the art that a variety of modifications and revisions may be added within a scope that does not depart from the intent of the present invention.

INDUSTRIAL APPLICABILITY

As the chabazite-type zeolite of the present invention exhibits high durability and heat resistance, it may be suitably used as a selective catalytic reduction catalyst for NOx in automobile exhaust gas.

The invention claimed is:

1. A chabazite-type zeolite, wherein said zeolite has a $SiO_2/Al_2O_3$ molar ratio of less than 15, an average crystal particle size of from 1.0 µm to 2.67 µm, and the crystal particle is dispersed as rhombohedral or cuboidal particles.

2. The chabazite-type zeolite according to claim 1, wherein said zeolite has a volume-based 90% particle size of 15.0 µm or less.

3. A chabazite-type zeolite, wherein said zeolite has a $SiO_2/Al_2O_3$ molar ratio of less than 15, an average crystal particle size of from 1.0 µm to 2.67 µm, the crystal particle is dispersed as rhombohedral or cuboidal particles, and is loaded with copper.

4. The chabazite-type zeolite according to claim 3, wherein said zeolite has a volume-based 90% particle size of 15.0 µm or less.

5. The chabazite-type zeolite according to claim 3, wherein an atomic ratio of copper/aluminum of said zeolite is 0.10 to 1.00.

6. The chabazite-type zeolite according to claim 3, wherein ion exchange sites of said zeolite are occupied by copper and/or protons ($H^+$).

7. The chabazite-type zeolite according to claim 3, wherein a crystal structure of said zeolite is SSZ-13.

8. A NOx reductive removal catalyst, comprising the chabazite-type zeolite according to claim 3.

9. The NOx reductive removal catalyst, comprising the chabazite-type zeolite according to claim 3, wherein said zeolite has a $SiO_2/Al_2O_3$ molar ratio of 13.3 or higher but less than 14.8, an average crystal particle size of from 1.50 µm to 2.67 µm and an atomic ratio of copper/aluminum of 0.24 to 0.32.

10. The chabazite-type zeolite according to claim 1, wherein said zeolite is obtainable by a method comprising crystallizing a raw material composition in which a structure-directing agent/$SiO_2$ molar ratio in the raw material composition satisfies 0.05≤(structure-directing agent)/$SiO_2$<0.13 and in which water/$SiO_2$ molar ratio in the raw material composition satisfies 5≤$H_2O$/$SiO_2$<30 in the presence of at least two types of cations selected from the group consisting of $Na^+$, $K^+$, $Rb^+$, $Cs^+$, and $NH_4^+$
wherein the structure-directing agent comprises at least one member selected from the group consisting of a hydroxide, halide, carbonate, methyl carbonate, and sulfate comprising N,N,N-trialkyladamantyl ammonium as a cation, N,N,N-trimethylbenzyl ammonium ion, N-alkyl-3-quinuclidinol ion, or N,N,N-trialkylexoaminonorbornane as a cation.

11. The chabazite-type zeolite according to claim 3, wherein said zeolite is obtainable by a method comprising crystallizing a raw material composition in which a structure-directing agent/$SiO_2$ molar ratio in the raw material composition satisfies 0.05≤(structure-directing agent)/$SiO_2$<0.13 and in which water/$SiO_2$ molar ratio in the raw material composition satisfies 5≤$H_2O$/$SiO_2$<30 in the presence of at least two types of cations selected from the group consisting of $Na^+$, $K^+$, $Rb^+$, $Cs^+$, and $NH_4^+$
wherein the structure-directing agent comprises at least one member selected from the group consisting of a hydroxide, halide, carbonate, methyl carbonate, and sulfate comprising N,N,N-trialkyladamantyl ammonium as a cation, N,N,N-trimethylbenzyl ammonium ion, N-alkyl-3-quinuclidinol ion, or N,N,N-trialkylexoaminonorbornane as a cation.

12. The chabazite-type zeolite according to claim 1, wherein said zeolite has a $SiO_2/Al_2O_3$ molar ratio of 10 or higher and less than 15.

13. The chabazite-type zeolite according to claim 3, wherein said zeolite has a $SiO_2/Al_2O_3$ molar ratio of 10 or higher and less than 15.

* * * * *